(12) United States Patent
Mukai et al.

(10) Patent No.: US 10,981,619 B2
(45) Date of Patent: Apr. 20, 2021

(54) SMALL-SIZED SADDLE RIDING VEHICLE, AND RIGIDITY ADJUSTMENT DEVICE OF BODY FRAME OF VEHICLE

(71) Applicant: HONDA MOTOR CO., LTD., Tokyo (JP)

(72) Inventors: Katsumasa Mukai, Wako (JP); Satoru Kubo, Wako (JP); Hiroki Yoshino, Wako (JP); Hirohisa Takahashi, Wako (JP); Kazuki Yamagishi, Wako (JP); Ryuji Sasaki, Wako (JP); Kiyotaka Sakai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 224 days.

(21) Appl. No.: 15/980,867

(22) Filed: May 16, 2018

(65) Prior Publication Data

US 2018/0346057 A1    Dec. 6, 2018

(30) Foreign Application Priority Data

May 31, 2017    (JP) ............................. JP2017-108553

(51) Int. Cl.
*B62K 25/04*       (2006.01)
*B62K 5/10*        (2013.01)
(Continued)

(52) U.S. Cl.
CPC ............. *B62K 25/04* (2013.01); *B60G 11/52* (2013.01); *B60G 17/02* (2013.01); *B60G 99/004* (2013.01);
(Continued)

(58) Field of Classification Search
CPC ................ B62K 5/10; B62K 2005/001; B60G 2300/122
See application file for complete search history.

(56) References Cited

U.S. PATENT DOCUMENTS 4,659,106 A * 4/1987 Fujita ................... B60G 21/007
                                                280/124.103
5,116,069 A * 5/1992 Miller ..................... B60G 3/14
                                                    180/210
(Continued)

FOREIGN PATENT DOCUMENTS

JP          63-015276       2/1988
JP           4580452       11/2010
(Continued)

OTHER PUBLICATIONS

European Search Report dated Nov. 7, 2018, 8 pages.

*Primary Examiner* — Jacob D Knutson
*Assistant Examiner* — Michael R Stabley
(74) *Attorney, Agent, or Firm* — Rankin, Hill & Clark LLP

(57) ABSTRACT

In a rocking vehicle, a front wheel suspension device suspends a front wheel in an upwardly displaceable manner due to a reaction force from a road surface. The rocking vehicle includes a cushion support arm, on a body frame side, including a cushion support portion of the front wheel suspension device, and a rigidity adjustment device which is extended between plural portions of the cushion support arm. The rigidity adjustment device applies a pre-tension to the cushion support arm, and the pre-tension generates a pre-force component in the cushion support portion in the same direction as the upward moving direction of the front wheel due to a reaction force of the front wheel from the road surface.

10 Claims, 17 Drawing Sheets

(51) Int. Cl.
*F16F 9/00* (2006.01)
*F16F 9/30* (2006.01)
*B62K 19/18* (2006.01)
*B60G 17/02* (2006.01)
*B62K 19/04* (2006.01)
*B62K 19/28* (2006.01)
*B60G 99/00* (2010.01)
*F16F 1/44* (2006.01)
*B60G 11/52* (2006.01)
*B62K 5/00* (2013.01)

(52) U.S. Cl.
CPC ............... *B62K 5/10* (2013.01); *B62K 19/04* (2013.01); *B62K 19/18* (2013.01); *B62K 19/28* (2013.01); *F16F 1/44* (2013.01); *F16F 9/003* (2013.01); *F16F 9/30* (2013.01); *B60G 2202/143* (2013.01); *B60G 2204/4108* (2013.01); *B60G 2300/122* (2013.01); *B60G 2300/45* (2013.01); *B62K 2005/001* (2013.01); *B62K 2201/02* (2013.01)

(56) References Cited

U.S. PATENT DOCUMENTS

| | | | | |
|---|---|---|---|---|
| 5,765,846 | A * | 6/1998 | Braun | B60G 21/026 280/124.103 |
| 6,367,824 | B1 * | 4/2002 | Hayashi | B62K 5/05 280/124.103 |
| 6,763,905 | B2 * | 7/2004 | Cocco | B60G 21/007 180/210 |
| 6,799,781 | B2 * | 10/2004 | Rasidescu | B62K 5/01 180/311 |
| 7,367,573 | B2 * | 5/2008 | Kudo | B62K 5/01 280/124.109 |
| 7,530,419 | B2 * | 5/2009 | Brudeli | B60G 21/007 180/210 |
| 7,562,885 | B2 * | 7/2009 | Marcacci | B62K 5/10 280/124.103 |
| 7,631,721 | B2 * | 12/2009 | Hobbs | B60G 21/007 180/348 |
| 8,016,302 | B1 * | 9/2011 | Reeve | B62K 5/05 280/124.103 |
| 9,278,711 | B2 * | 3/2016 | Takano | B62K 5/05 |
| 9,499,024 | B2 * | 11/2016 | Mori | B60G 21/05 |
| 9,517,807 | B2 * | 12/2016 | Takano | B60G 3/01 |
| 9,586,642 | B2 * | 3/2017 | Mori | B62K 5/10 |
| 9,623,928 | B2 * | 4/2017 | Mori | B62D 9/02 |
| 9,758,207 | B2 * | 9/2017 | Iizuka | B62K 5/10 |
| 9,796,417 | B2 * | 10/2017 | Mori | B60G 7/04 |
| 9,821,874 | B2 * | 11/2017 | Takano | B62K 5/05 |
| 2004/0119259 | A1 * | 6/2004 | Takayanagi | B62K 5/027 280/124.134 |
| 2009/0243248 | A1 * | 10/2009 | Nakamura | B60G 3/20 280/124.135 |
| 2016/0152293 | A1 * | 6/2016 | Hirayama | B62K 5/08 280/124.103 |
| 2016/0272264 | A1 * | 9/2016 | Mogensen | B62K 5/05 |

FOREIGN PATENT DOCUMENTS

| | | |
|---|---|---|
| JP | 4627389 | 2/2011 |
| JP | 5911015 | 4/2016 |

* cited by examiner

SMALL-SIZED SADDLE RIDING VEHICLE, AND RIGIDITY ADJUSTMENT DEVICE OF BODY FRAME OF VEHICLE

INCORPORATION BY REFERENCE

The present application claims priority under 35 U.S.C. § 119 to Japanese Patent Application No. 2017-108553 filed on May 31, 2017. The content of the application is incorporated herein by reference in its entirety.

Technical Field

The present invention relates to a small-sized saddle riding vehicle, and a rigidity adjustment device of a body frame of a vehicle.

Background Art

Conventionally, there has been known a reinforcing rod which: is connected between left and right strut towers of a four-wheeled vehicle; includes a tension adjustment mechanism (ratchet mechanism); adjusts a length thereof in a left and right width direction; and adjusts a tension thus adjusting rigidity of a vehicle body between left and right sides (patent literature 1).

In the same manner as patent literature 1, there has been known a structure used for connecting left and right sides of a four-wheeled vehicle such as strut towers where, by incorporating a known hydraulic dumper into the structure, the deformation of a vehicle body in a longitudinal direction of a rod is delayed thus suppressing an overshoot of deformation (patent literature 2).

Further, there has been known a load applying device which applies a load to a body frame which forms a support portion for a wheel in a longitudinal direction (patent literature 3).

Still further, there has been known a structure where vibration which a two-wheeled vehicle receives from a road surface during traveling is attenuated by a mass dumper disposed in a head pipe of the two-wheeled vehicle (patent literature 4).

The above-mentioned patent literature 1 and patent literature 2 disclose the configuration where the deformation is delayed in the left and right directions of a four-wheeled vehicle by rigidity adjustment or a dumper. Further, in patent literature 3, a response of lateral displacement of left and right wheels is made quicker by applying a load to a vehicle body which forms a support portion for left and right wheels thus eliminating hysteresis.

Such rigidity reinforcement between the left and right wheels of the vehicle body or the suppression of an overshoot brought about by a dumper effect is performed by a vehicle body mounted member in a four-wheeled vehicle. Meanwhile, in a small-sized vehicle such as a saddle riding vehicle, for example, in a two-wheeled vehicle or the like, since the small-sized vehicle has a small lateral width, the difference in lateral displacement in left and right directions does not largely affect a traveling performance. Whereas, for example, a reaction of a front wheel from a road surface is directly transmitted to a handle by way of a suspension and hence, a response of displacement in an extending and shrinking direction of a suspension contributes to a drive performance of a two-wheeled vehicle or a characteristic of the vehicle.

In patent literature 4, vibration of a two-wheeled vehicle which is a saddle riding vehicle is effectively attenuated, the vibration changing in an axial direction (vehicle vertical direction) of a steering shaft from a road surface by way of a suspension.

CITATION LIST

Patent Literature

[Patent Literature 1] JP-UM-A-63-15276
[Patent Literature 2] Japanese Patent No. 4627389
[Patent Literature 3] Japanese Patent No. 4580452
[Patent Literature 4] Japanese Patent No. 5911015

SUMMARY OF INVENTION

Technical Problem

In the small-sized saddle riding vehicle, however, depending on a kind of the vehicle, there may be a case where a wheel or a vehicle body requires a quick response corresponding to a change of a road surface. In such a case, it is desirable that an initial operation of extension and shrinkage of a suspension, a body frame or the like which is connected with the suspension starts the displacement properly within a short time.

It is an object of the present invention to provide a small-sized saddle riding vehicle and a rigidity adjustment device of a body frame of a vehicle which can effectively displace a suspension and a body frame by quickly responding to mainly a force from a road surface in a jolting direction.

Solution to Problem

An aspect of the present invention provides a small-sized saddle riding vehicle where the saddle riding vehicle includes a body frame (11, 145, 241, 320) and a suspension device (12, 144, 245) which connects the body frame (11, 145, 241, 320) and respective wheels (13, 141, 244) to each other, and the suspension device (12, 144, 245) is configured to suspend the wheels (13, 141, 244) in a displaceable manner in an upward direction due to a reaction force from a road surface, wherein the small-sized saddle riding vehicle further includes a rigid member (64, 174, 264, 332), on the body frame (11, 145, 241, 320) side, having a support portion (64k, 208, 254, 321) of the suspension device (12, 144, 245), and a rigidity adjustment device (90, 300, 350, 350A) which is extended between a plural portions of the rigid member (64, 174, 264, 332), the rigidity adjustment device (90, 300, 350, 350A) is configured to apply a pre-tension to the rigid member (64, 174, 264, 332), and the pre-tension is set to generate a pre-force component to the support portion (64k, 208, 254, 321) in the same direction as an upward moving direction of the wheel (13, 141, 244) due to a reaction force of the wheel (13, 141, 244) from the road surface.

In the above-mentioned aspect of the invention, the rigid member (64, 174, 264, 332) may include at least two lug portions (62a, 64b, 64c, 154, 173, 255b, 255b, 322, 324) which are connected in different extending directions, the rigidity adjustment device (90, 300, 350) may form a triangular shape together with the rigid member (64, 174, 264, 332) by being extended between the two lug portions (62a, 64b, 64c, 154, 173, 255b, 322, 324), and applies a pre-tension between two lug portions (62a, 64b, 64c, 154, 173, 255b, 255b, 322, 324), and the pre-tension may be set to generate a pre-force component at the support portion (64k, 208, 254, 321) in the same direction as the upward moving direction of the wheel (13, 141, 244) due to a reaction force of the wheel (13, 141, 244) from the road surface.

In the above-mentioned aspect of the invention, the rigidity adjustment device (90, 300, 350, 350A) may possess both a tension generation function and a vibration attenuation function.

In the above-mentioned aspect of the invention, the rigidity adjustment device (90, 300, 350, 350A) may be configured to provide generation of a tension and attenuation of vibration by a rubber member (92).

In the above-mentioned aspect of the invention, the suspension device (12, 144) may include a cushion unit (65, 206), and a mounting portion of the cushion unit (65, 206) on the body frame (11, 145) side may be formed on one of the two lug portions (62a, 64b, 64c, 154, 173).

In the above-mentioned aspect of the invention, the small-sized saddle riding vehicle may be a rocking vehicle (10), the rigid member (64) may be connected to the body frame (11) by way of a rocking shaft (63), the rigid member (64) may include a support portion (64k) for the cushion unit (65) on the body frame (11) side, a mounting portion of the cushion unit (65) and one mounting portion of the rigidity adjustment device (90) may be provided to one lug portion (64a, 64b) of the rigid member (64), and the other mounting portion of the rigidity adjustment device (90) may be provided to the other lug portion (64c) of the rigid member (64).

In the above-mentioned aspect of the invention, two lug portions (255b, 255b) may form a part of the body frame (241), the suspension device (245) may be supported by a connecting portion (254) of the two lug portions (255b, 255b), and by applying a pre-tension to the two lug portions (255b, 255b), a pre-force may be generated on the suspension device (245) in the same direction as the upward moving direction of the wheel (244) due to a reaction force of the wheel (244) from the road surface.

In the above-mentioned aspect of the invention, the saddle riding vehicle may include a plurality of the rigidity adjustment devices (90, 130), and the rigidity adjustment devices (90, 130) may include the first rigidity adjustment device (90) which generates a pre-force component of the support portion (64k) in the same direction as an upward moving direction of the wheel (13) due to a reaction force of the wheel (13) from a road surface and the second rigidity adjustment device (130) which generates a pre-force component of the support portion (64k) in the same direction as a downward moving direction of the wheel (13) due to a reaction force of the wheel (13) from the road surface.

In the above-mentioned aspect of the invention, a pre-tension of the first rigidity adjustment device (90) and a pre-tension of the second rigidity adjustment device (130) may be made different from each other.

An aspect of the present invention provides a rigidity adjustment device of a body frame of a small-sized vehicle, wherein the small-sized vehicle (10, 140, 240, 370) includes a suspension device (12, 144, 245, 372) which connects the body frame (11, 145, 241, 320, 371) and a wheel (13, 141, 244, 373) to each other, in which a pre-tension is applied to a mounting portion of the suspension device (12, 144, 245, 372) of the small-sized vehicle (10, 140, 240, 370), the rigidity adjustment device (90, 130, 300, 350, 350C) includes: a cylinder (91); a rod (94) which penetrates one end portion of the cylinder (91) and extends from the inside of the cylinder (91) to the outside of the cylinder (91); and a plate-like member (93) which is provided to one-end portion of the rod (94) in the inside of the cylinder (91) and is movable in the inside of the cylinder (91) integrally with the rod (94), in which an elastic member (92) is disposed between the plate-like member (93) and the cylinder (91), a mounting portion for the body frame (11, 145, 241, 320) is provided to the other end portion of the rod (94) and the other end portion of the cylinder (91), and a tension adjustment mechanism (97) is provided to the rod (94) and the cylinder (91), or on either one of the rod (94) or the cylinder (91).

In the above-mentioned aspect of the invention, the elastic member (92) may be a rubber member (92).

Advantageous Effects of Invention

The small-sized saddle riding vehicle according to the aspect of the present invention includes the rigid member, on a body frame side, having the support portion of the suspension device, and the rigidity adjustment device extended between the plurality of portions of the rigid member. The rigidity adjustment device applies a pre-tension to the rigid member, and the pre-tension generates a pre-force component in the support portion in the same direction as the upward moving direction of the wheel due to a reaction force of the wheel from the road surface. With such a configuration, a hysteresis loss of the rigid member on the body frame side can be decreased and hence, the rigid member quickly responds to a force from the road surface in a jolting direction or the like so as to assist starting of the upward movement of the wheel whereby the suspension device and the body frame can be effectively displaced in the upward direction. Accordingly, a response speed of the suspension device is increased, and the suspension device can quickly respond to a change of the road surface thus providing a small-sized saddle riding vehicle which enables a rider to enjoy light riding.

In the above-mentioned aspect of the invention, the rigid member includes at least two lug portions connected in different extending direction, and the rigidity adjustment device is extended between two lug portions. With such a configuration, the rigidity adjustment device forms triangular shapes together with the rigid member and, at the same time, a pre-tension is applied between two lug portions, and the pre-tension generates a pre-force component at the support portion in the same direction as an upward moving direction of the wheel due to a reaction force of the wheel from a road surface and hence, the pre-tension can be effectively applied with a simple configuration where the rigidity adjustment device is extended between two lug portions.

In the above-mentioned aspect of the invention, the rigidity adjustment device possesses both a tension generation function and a vibration attenuation function. Accordingly, starting of the movement in the upward direction of the wheel can be made quicker and, at the same time, vibration of the vehicle body which is generated thereafter can be converged.

In the above-mentioned aspect of the invention, the rigidity adjustment device exhibits the generation of tension and the attenuation of vibration due to the rubber member. Accordingly, with the inexpensive and simple structure, starting of the upward movement of the wheel can be made quicker and, at the same time, the vibration of the vehicle body generated thereafter can be converged with high performance.

In the above-mentioned aspect of the invention, the suspension device includes the cushion unit, and the mounting portion of the cushion unit on a body frame side is provided to one of two lug portions. With such a configuration, the rigidity adjustment device can be mounted at a position close to the cushion unit and hence, a response speed of the suspension device is increased whereby the suspension device can quickly respond to a change of a road surface thus providing a small-sized saddle riding vehicle allowing a rider to enjoy lighter riding.

In the above-mentioned aspect of the invention, the small-sized saddle riding vehicle is the rocking vehicle, the rigid member is connected to the body frame by way of the rocking shaft, the rigid member includes the support portion of the cushion unit on the body frame side, a mounting portion of the cushion unit and one mounting portion of the rigidity adjustment device are provided to one lug portion of the rigid member, and the other mounting portion of the rigidity adjustment device is provided to the other lug portion of the rigid member. With such a configuration, starting of the movement of the wheel of the rocking vehicle in an upward direction can be assisted and hence, a response to a change of a road surface is made quicker thus providing a small-sized saddle riding vehicle which allows a rider to enjoy light riding.

In the above-mentioned aspect of the invention, two lug portions form a part of the body frame, a suspension device is supported by the connecting portion of two lug portions, and a pre-tension is applied to two lug portions. With such a configuration, a pre-force can be generated to the suspension device in the same direction as the upward moving direction of the wheel due to a reaction force of the wheel from the road surface. Accordingly, by merely mounting the rigidity adjustment device on a part of the body frame, starting of the movement of the wheel in the upward direction can be assisted thus easily enhancing the performance of the suspension device.

In the above-mentioned aspect of the invention, the small-sized saddle riding vehicle includes a plurality of the rigidity adjustment devices, and the rigidity adjustment devices include the first rigidity adjustment device which generates a pre-force component of the support portion in the same direction as an upward moving direction of the wheel due to a reaction force of the wheel from a road surface and the second rigidity adjustment device which generates a pre-force component of the support portion in the same direction as a downward moving direction of the wheel due to a reaction force of the wheel from a road surface. With such a configuration, starting of the upward movement of the wheel can be made quicker and, at the same time, the movement of the wheel in the downward direction is also assisted thus leading the rapid response and smooth vertical movement of the wheel.

In the above-mentioned aspect of the invention, a pre-tension of the first rigidity adjustment device and a pre-tension of the second rigidity adjustment device are made different from each other. With such a configuration, by adjusting a speed of vertical movement of the wheel, it is possible to provide a small-sized saddle riding vehicle having the suspension device which exhibits high performance corresponding to a characteristic of the vehicle.

In the aspect of the present invention, a pre-tension is applied to the mounting portion of the suspension device of the small-sized vehicle having the suspension device which connects the body frame and the wheel to each other. The rigidity adjustment device includes: the cylinder; the rod which penetrates one end portion of the cylinder and extends from the inside of the cylinder to the outside of the cylinder; and a plate-like member which is provided to one end portion in the inside of the cylinder of the rod and moves in the inside of the cylinder integrally with the rod, in which an elastic member is disposed between the plate-like member and one end portion of the cylinder, the mounting portion on a vehicle frame side is provided to the other end portion of the rod and the other end portion of the cylinder, and the tension adjustment mechanism is provided to the rod and the cylinder, or on either one of the rod or the cylinder. Accordingly, it is possible to provide the rigidity adjustment device suitable for making starting of the upward movement of the wheel quicker and, which can be easily mounted and can be easily adjusted with the simple structure.

In the above-mentioned aspect of the invention, the elastic member is the rubber member. Accordingly, the elastic member possesses both a tension generation function and a vibration attenuation function and hence, it is possible to provide a rigidity adjustment device suitable for making starting of upward movement of the wheel quicker at a low cost.

BRIEF DESCRIPTION OF DRAWINGS

FIG. 6A to FIG. 6C are explanatory views showing a connecting portion to which one end of the rigidity adjustment device is connected, wherein FIG. 6A is a side view showing a rod support portion formed on a cushion support arm, FIG. 6B is a side view showing the rod support portion formed on the connecting portion extending in a vertical direction, and FIG. 6C is a side view showing a connecting structure between a rod of a rigidity adjustment device and a rod support portion according to a modification.

DESCRIPTION OF EMBODIMENTS

Hereinafter, one embodiment of the present invention is described with reference to drawings. In the description, directions of frontward, rearward, leftward, rightward, upward, and downward are equal to directions of a vehicle body unless otherwise specified. Further, in respective drawings, symbol FR indicates a vehicle-body frontward direction, symbol UP indicates a vehicle-body upward direction, and symbol LH indicates a vehicle-body leftward direction.

First Embodiment

Figure 1:
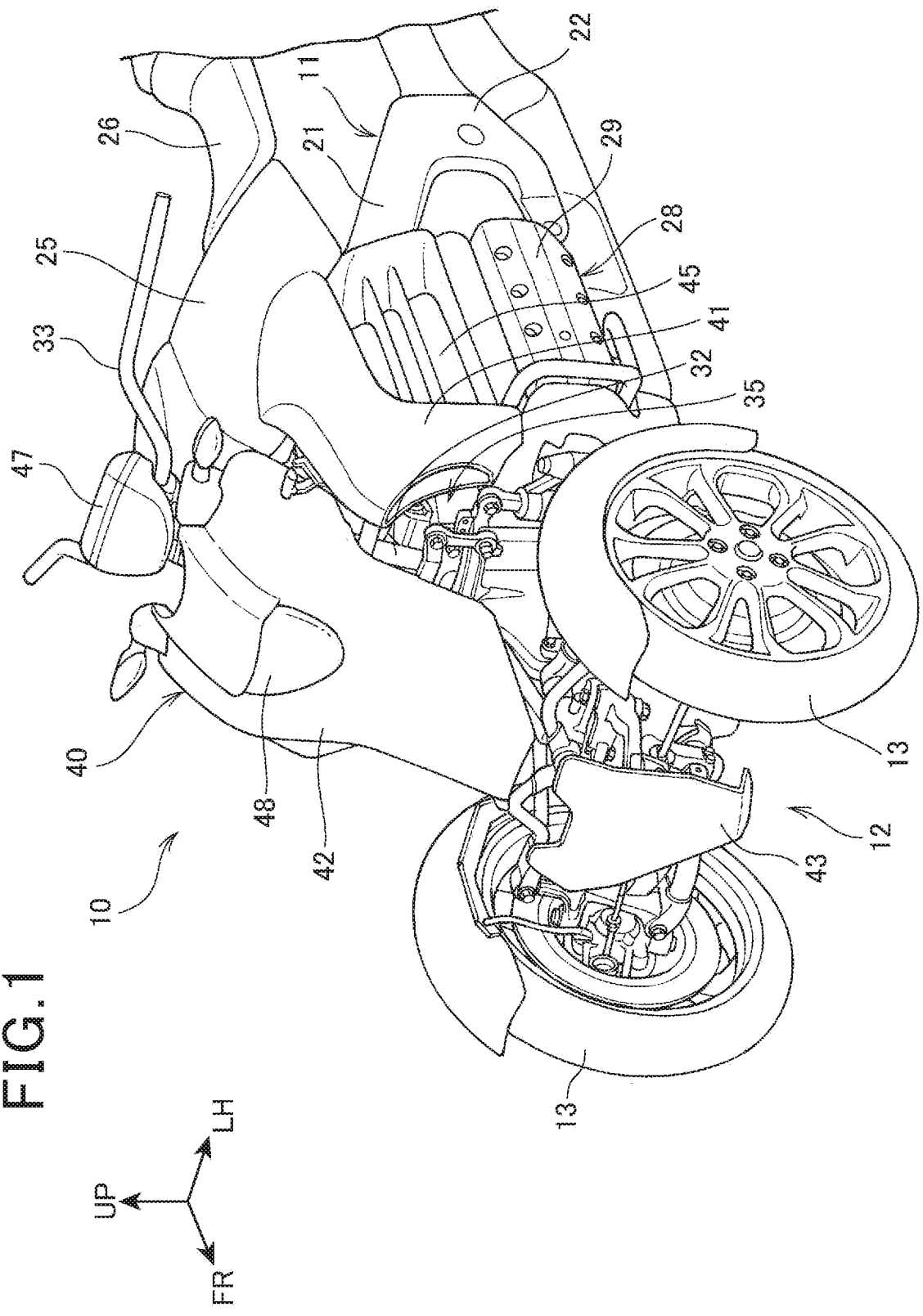
FIG. 1 is a perspective view showing a rocking vehicle provided with a rigidity adjustment device according to a first embodiment of the present invention.

FIG. 1 is a perspective view showing a rocking vehicle 10 provided with a rigidity adjustment device 90 according to a first embodiment of the present invention.

The rocking vehicle 10 is a three-wheeled vehicle where a pair of left and right front wheels 13, 13 is supported on a front portion of a body frame 11 by way of a front wheel suspension device 12, and a single rear wheel (not shown in the drawing) is supported on a rear portion of a body frame 11 thus making the body frame 11 rockable in the left and right directions.

The body frame 11 includes: a pair of left and right main frames 21; a pair of left and right pivot frames 22; and a pair of left and right down frames (not shown in the drawing).

The left and right main frames 21 form a front portion of the body frame 11, and front end portions of the left and right main frames 21 are bent inward in a vehicle width direction respectively and are joined to each other.

The left and right pivot frames 22 extend downward from rear portions of the left and right main frames 21 respectively. The pair of left and right down frames extends downward from front end portions of the left and right main frames 21 and, thereafter, is bent and extend rearward and, further, is connected to the front side of lower portions of the left and right pivot frames 22 respectively.

The body frame 11 includes a plurality of cross frames (not shown in the drawing) which connect the left and right frame members to each other.

A fuel tank 25 is mounted on front upper portions of the left and right main frames 21, and a seat 26 is disposed behind the fuel tank 25. The rocking vehicle 10 is a small-sized saddle riding vehicle where a driver rides on the seat 26 in a straddling manner.

A power unit 28 is supported on the body frame 11 at a position below the fuel tank 25. The power unit 28 includes an engine 29, and a transmission (not shown in the drawing) which is integrally mounted on a rear portion of the engine 29.

A steering post 31 (see FIG. 3) is provided to front portions of the left and right main frames 21, and an upper portion of a steering shaft 32 is rotatably supported by the steering post 31. A handlebar 33 is mounted on an upper end portion of the steering shaft 32. The steering shaft 32 and the handlebar 33 form a portion of a front wheel steering mechanism 35 for steering left and right front wheels 13.

The rocking vehicle 10 includes a vehicle body cover 40 which covers respective portions of the vehicle body. The vehicle body cover 40 includes a pair of left and right radiator shrouds 41, a front cover 42, and a front lower cover 43. The left and right radiator shrouds 41 cover a pair of left and right radiators 45 respectively disposed above both side portions of the engine 29 from the side respectively. The front cover 42 covers the steering shaft 32 and the periphery of the steering shaft 32 from a front side. The front lower cover 43 covers a center portion of the front wheel suspension device 12 in a vehicle width direction from the front side.

A meter 47 is mounted on a center portion of the handlebar 33, and a headlight 48 is mounted on the front cover 42.

Figure 2:
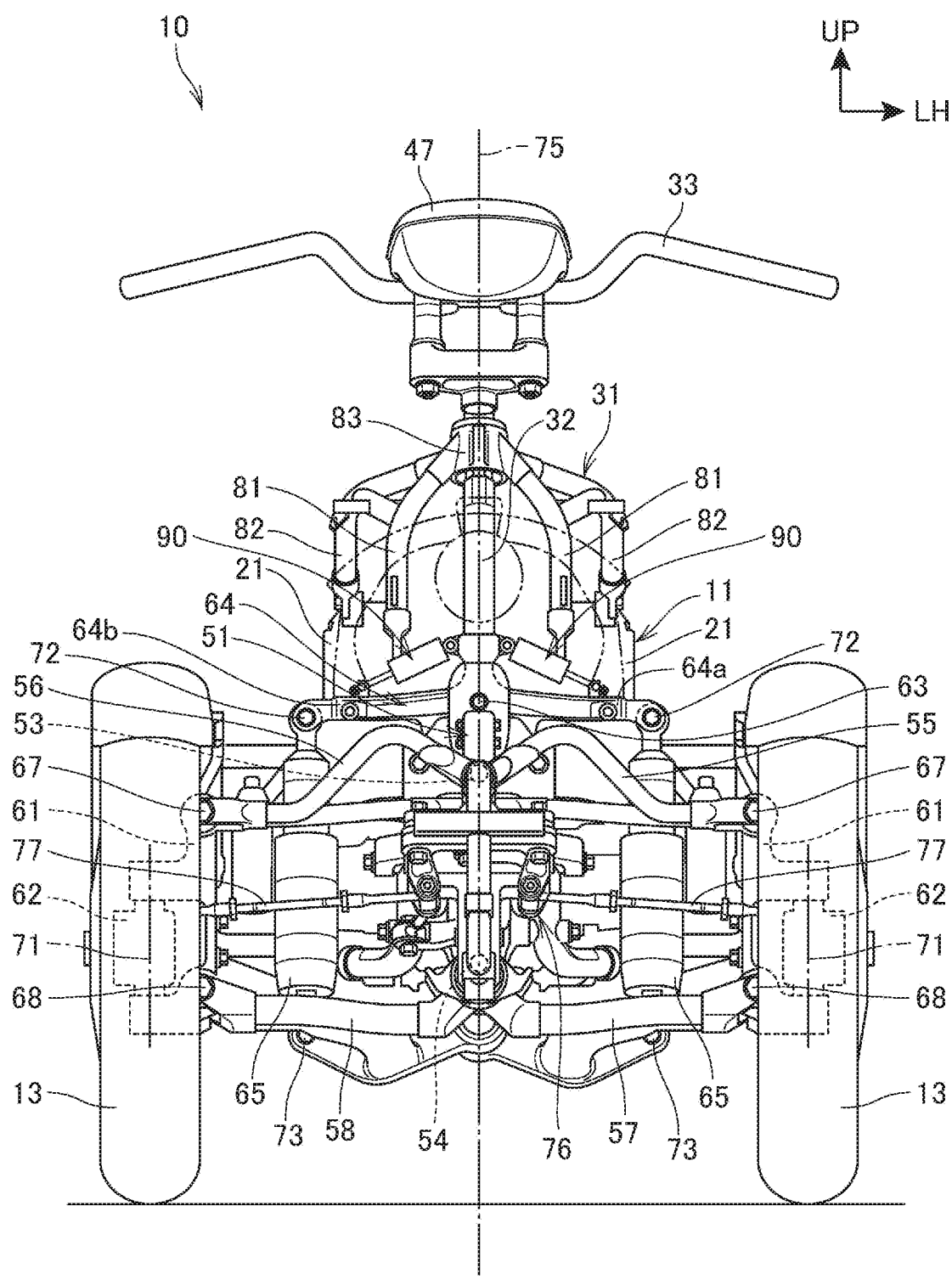
FIG. 2 is a front view showing the rocking vehicle.
Figure 3:
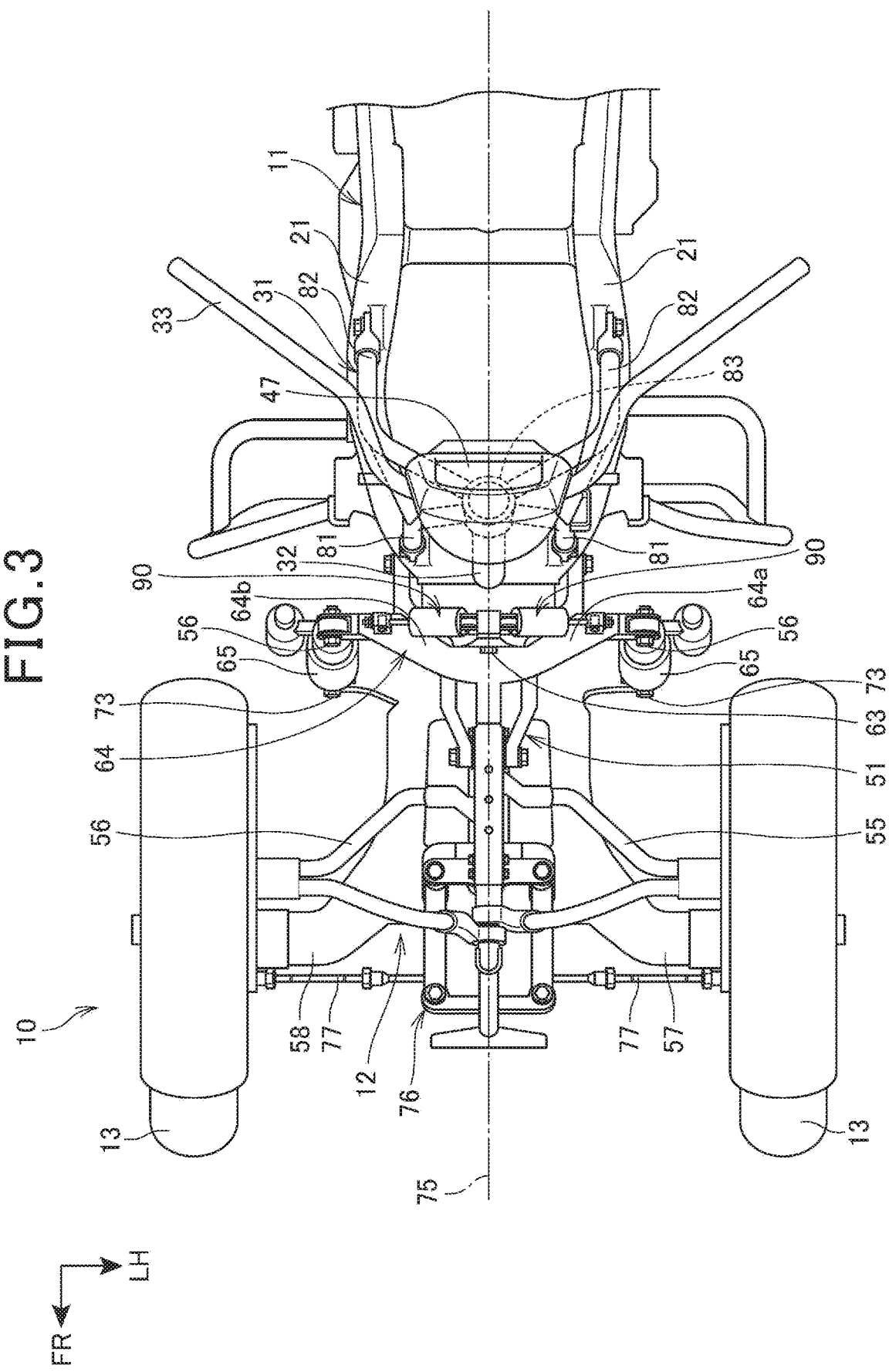
FIG. 3 is a plan view showing the rocking vehicle.

FIG. 2 is a front view showing the rocking vehicle 10, and FIG. 3 is a plan view showing the rocking vehicle 10.

As shown in FIG. 2 and FIG. 3, a front suspension frame 51 which constitutes the body frame 11 is fastened to front end portions of the left and right main frames 21 and the left and right down frames, and the front wheel suspension device 12 is connected to the front suspension frame 51.

The front wheel suspension device 12 is a double wishbone type suspension device which suspends the left and right front wheels 13 independently. To be more specific, the front wheel suspension device 12 includes: a pair of front and rear upper rocking shafts 53; a pair of front and rear lower rocking shafts 54; a pair of left and right upper arms 55, 56; a pair of left and right lower arms 57, 58; a pair of left and right arm end link members 61; a pair of left and right knuckles 62; a rocking shaft 63; a cushion support arm 64; and a pair of left and right cushion units 65.

The pair of front and rear upper rocking shafts 53 is disposed on an upper portion of the front suspension frame 51, and the pair of front and rear lower rocking shafts 54 is disposed on a lower portion of the front suspension frame 51. Each of the pair of front and rear upper rocking shafts 53 and the pair of front and rear lower rocking shafts 54 is disposed coaxially and in a spaced-apart manner in the longitudinal direction of the vehicle at the center in the vehicle width direction such that each of the pair of front and rear upper rocking shafts 53 and the pair of front and rear lower rocking shafts 54 extend in the longitudinal direction of the vehicle.

End portions of the left and right upper arms 55, 56 on an inner side in the vehicle width direction are supported on the pair of upper rocking shafts 53 respectively in a rockable manner, and end portions of the left and right lower arms 57, 58 on an inner side in the vehicle width direction are supported on the pair of lower rocking shafts 54 respectively in a rockable manner.

Upper end portions of the arm end link members 61 are respectively mounted on end portions of the left and right upper arms 55, 56 on an outer side in the vehicle width direction by way of outside upper rocking shafts 67 in a rockable manner. Lower end portions of the arm end link members 61 are respectively mounted on end portions of the left and right lower arms 57, 58 on an outer side in the vehicle width direction by way of outside lower rocking shafts 68 in a rockable manner.

Knuckles 62 are respectively supported by the left and right arm end link members 61 in a laterally rockable manner by way of king pins (not shown in the drawing) each having a king pin axis 71 extending in the vertical direction. A hub (not shown in the drawing) is supported by each knuckle 62 in a rotatable manner, and the front wheel 13 is fastened to the hub.

On an upper portion of the front suspension frame 51 (to be more specific, a portion of the front suspension frame 51 at a position above the upper rocking shaft 53) and at the center in the vehicle width direction, a rocking shaft 63 is disposed and extends in the longitudinal direction of the vehicle parallel to the upper rocking shafts 53 and the lower rocking shafts 54, and a cushion support arms 64 is supported on the rocking shaft 63 in a vertically rockable manner such that the cushion support arm 64 extends in the vehicle width direction.

The center of the cushion support arm 64 in the longitudinal direction (the center in the vehicle width direction) is supported on the rocking shaft 63. Upper end portions of the cushion units 65 which form buffers are respectively mounted on both end portions of the cushion support arm 64 in a rockable manner by way of upper connecting pins 72. Lower end portions of the left and right cushion units 65 are respectively mounted to intermediate portions of the left and right lower arms 57, 58 in the longitudinal direction in a rockable manner by way of lower connecting pins 73.

A rocking control mechanism (not shown in the drawing) which controls rocking of the vehicle body including the body frame 11 in the left and right directions is connected to the cushion support arm 64.

The rocking control mechanism includes an actuator, a connection device, a rocking arm, a pair of left and right vertical link members, and an Electronic Control Unit (ECU).

A center portion in the longitudinal direction of the rocking arm extending horizontally is mounted on a rotary shaft of the actuator which is formed of an electric motor by way of the connection device. Upper end portions of the left and right vertical link members disposed in a vertically elongated manner are respectively connected to both end portions of the rocking arm. Lower end portions of the left and right vertical link members are respectively connected to a left arm 64a and a right arm 64b of the cushion support arm 64.

A torque detection sensor which detects a torque generated between the rotary shaft of the actuator and the rocking arm is incorporated in the connection device. The ECU controls a rocking angle of the vehicle body in the left and right directions by driving the actuator based on a torque detected by the connection device, a vehicle speed and an inclination of a vehicle detected by various sensors provided to the vehicle body, a manipulated variable of the handlebar 33 by a rider and the like.

The rocking vehicle 10 includes a rocking lock mechanism (not shown in the drawing) which can lock rocking of the vehicle body in the left and right directions.

The rocking lock mechanism includes: a lock plate which is formed into an arcuate shape about the rocking shaft 63 and is mounted on the cushion support arm 64; and a lock caliper which is mounted on a steering post side and applies braking by sandwiching the lock plate.

The center axis of the steering shaft 32 is positioned above a vehicle body center line 75 extending vertically at the center in the vehicle width direction as viewed in a front view. A lower portion of the steering shaft 32 is rotatably supported by a rear portion of the front suspension frame 51.

The front wheel steering mechanism 35 includes: a pair of left and right steering link mechanisms 76 which is connected to a lower end portion of the steering shaft 32; and a pair of left and right tie rods 77 which is connected to the left and right steering link mechanisms 76 respectively.

The left and right tie rods 77 are connected to the knuckles 62 respectively.

The steering post 31 includes: a plurality of leg portions 81, 82; and a circular cylindrical shaft holder 83 which is supported on upper end portions of the plurality of leg portions 81, 82.

The shaft holder 83 rotatably supports the steering shaft 32 by way of a bearing.

Figure 4:
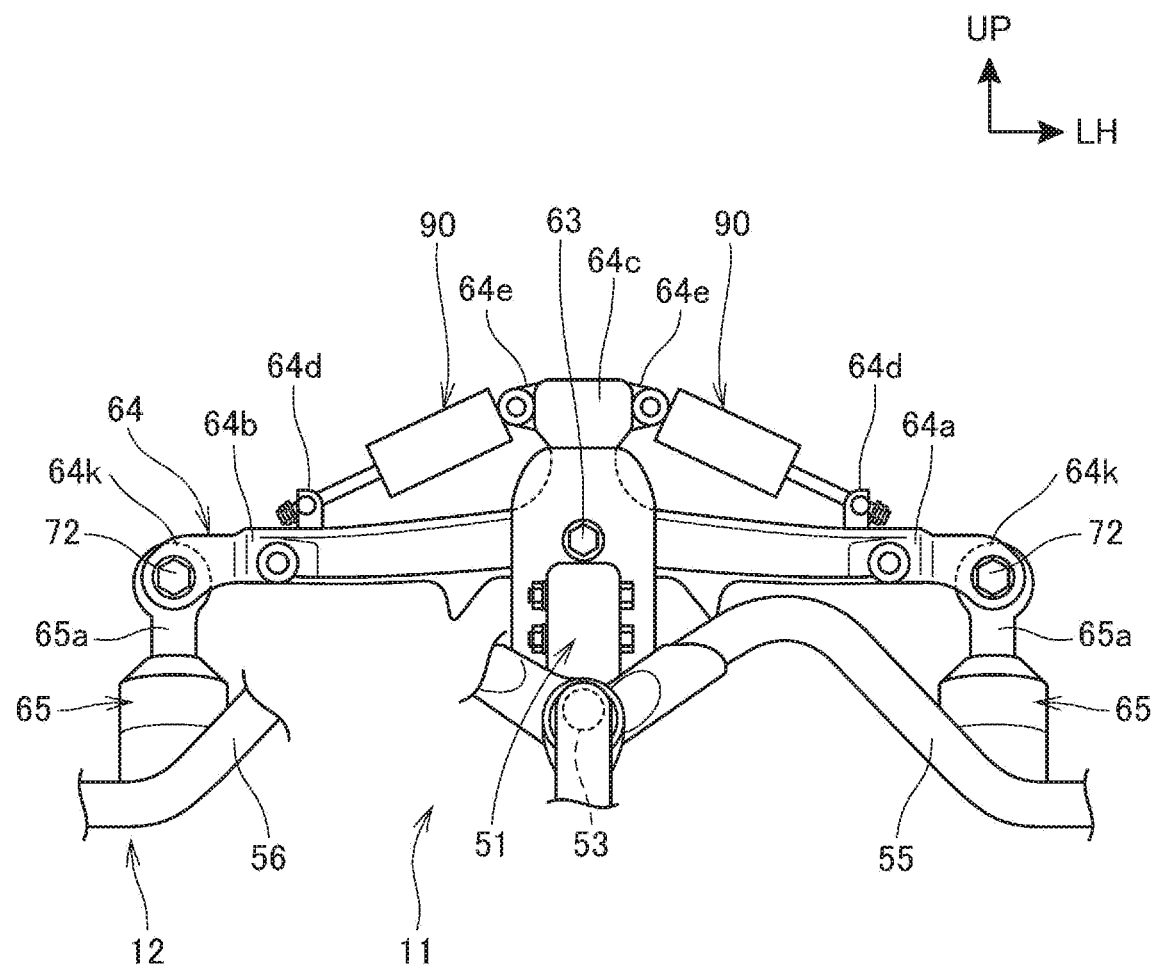
FIG. 4 is an enlarged view of a main part of the rocking vehicle shown in FIG. 2.

FIG. 4 is an enlarged view of a main part of the rocking vehicle shown in FIG. 2.

The cushion support arm 64 is an integral body formed of: the left arm 64a and the right arm 64b respectively extending leftward and rightward using the rocking shaft 63 as a boundary; and an upwardly extending portion 64c which extends upward at a position above the rocking shaft 63. A cushion support portion 64k which supports an upper end portion 65a of the cushion unit 65 by way of an upper connecting pin 72 is formed on respective end portions of the left arm 64a and the right arm 64b.

Upper protruding portions 64d, 64d are integrally formed on upper portions of the left arm 64a and the right arm 64b inside the upper connecting pins 72 in the vehicle width direction respectively. A pair of left and right sidewardly protruding portions 64e which protrudes outward in the vehicle width direction is integrally formed on an upper portion of the upwardly extending portion 64c.

A rigidity adjustment device 90 which adjusts rigidity of the cushion support arm 64 is mounted on the left upper protruding portion 64d and the left sidewardly protruding portion 64e and on the right upper protruding portion 64d and the right sidewardly protruding portion 64e respectively.

The rigidity adjustment device 90 is mounted between the left upper protruding portion 64d and the left sidewardly protruding portion 64e and between the right upper protruding portion 64d and the right sidewardly protruding portion 64e respectively such that a tensile force acts between the left upper protruding portion 64d and the left sidewardly protruding portion 64e and between the right upper protruding portion 64d and the right sidewardly protruding portion 64e respectively. That is, a pre-tension is applied to the cushion support arm 64 which is a rigid member in a direction that a cushion support portion 64k side of the cushion support arm 64 is deflected upward with respect to a rocking shaft 63 side.

As shown in FIG. 2 to FIG. 4 described above, the rocking vehicle 10 which forms a small-sized saddle riding vehicle includes: the body frame 11; and the front wheel suspension device 12 which forms a suspension device for connecting the body frame 11 and the front wheels 13 which form wheels to each other.

In the rocking vehicle 10, the front wheel suspension device 12 suspends the front wheels 13 in an upwardly displaceable manner due to a reaction force from a road surface. The rocking vehicle 10 includes: the cushion support arm portion 64 which forms a rigid member, on a body frame 11 side, including the cushion support portions 64k as support portions of the front wheel suspension device 12; and the rigidity adjustment devices 90 which are respectively extended between the plural portions of the cushion support arm 64. The rigidity adjustment devices 90 apply a pre-tension to the cushion support arm 64, and such a pre-tension generates a pre-force component in the same direction as the upwardly moving direction of the front wheel 13 due to a reaction force of the front wheel 13 from a road surface on the cushion support portion 64k.

With such a configuration, a hysteresis loss of the cushion support arm 64 on a body frame 11 side can be made small and hence, starting of deflection of the rigid member (cushion support frame 64) toward the body frame 11 having the support portion (cushion support portion 64k) of the front wheel suspension device 12 is made quicker. Accordingly, the rigid member quickly responds to the upward movement of the front wheel 13 so as to assist starting of the upward movement of the front wheel 13 and hence, the cushion support portion 64k of the front wheel suspension device 12 can be effectively displaced upward. With such a configuration, a response speed of the front wheel suspension device 12 is increased and hence, the front wheel suspension device 12 can quickly respond to a change in a road surface thus providing the rocking vehicle (small-sized saddle riding vehicle) 10 which enables a rider to enjoy light riding.

As shown in FIG. 4, the cushion support arm 64 includes at least two lug portions connected to each other while extending in the different directions. That is, the cushion support arm 64 includes the left arm 64a (one lug portion), the right arm 64b (one lug portion), and the upwardly extending portion 64c (other lug portion). The rigidity adjustment device 90 is extended between the left arm 64a and the upwardly extending portion 64c and between the right arm 64b and the upwardly extending portion 64c respectively and hence, triangular shapes are formed by the left and right respective arms 64a, 64b and the upwardly extending portion 64c and the rigidity adjustment devices 90 and, at the same time, the rigidity adjustment devices 90 respectively apply a pre-tension between two arms, that is, the left arm 64a and the right arm 64b and the upwardly extending portion 64c such that the left arm 64a and the upwardly extending portion 64c pull each other and the right arm 64b and the upwardly extending portion 64c pull each other. Such a pre-tension generates a pre-force component in the same direction as the upwardly moving direction of the front wheel 13 due to a reaction force of the front wheel 13 from a road surface on the cushion support portion 64k.

Accordingly, with the simple configuration where the rigidity adjustment devices 90 are extended between two arms 64a, 64b, that is, between the left arm 64a and the upwardly extending portion 64c, and between the right arm 64b and the upwardly extending portion 64c respectively, a pre-tension can be effectively applied to the cushion support frame 64.

As shown in the above-mentioned FIG. 2 and FIG. 4, the front wheel suspension device 12 has the cushion units 65. The front wheel suspension device 12 also has the cushion support portions 64k which form mounting portions for mounting the cushion units 65 on a body frame 11 side. That is, the cushion unit 65 is mounted on one side of the cushion support arm 64 which is the rigid member, and one end of the rigidity adjustment device 90 is mounted on this one side.

With such a configuration, the rigidity adjustment device 90 can be mounted at a position closer to the cushion unit 65 and hence, a response speed of the front wheel suspension device 12 is increased so that the front wheel suspension device 12 can quickly respond to a change in a road surface thus providing the rocking vehicle (small-sized saddle riding vehicle) 10 which enables a rider to enjoy light riding.

As shown in FIG. 4 described above, the small-sized saddle riding vehicle is the rocking vehicle 10. The cushion support arm 64 is connected to the body frame 11 by way of the rocking shaft 63. The cushion support arm 64 has the cushion support portions 64k for the cushion units 65 on a body frame 11 side. To the left arm 64a and the right arm 64b which form one lug portion of the cushion support arm 64, the cushion support portions 64k which are the mounting portion for mounting the cushion units 65 and the upper protruding portions 64d which are one mounting portion for mounting the rigidity adjustment devices 90 are provided respectively. To the upwardly extending portion 64c which forms the other lug portion of the cushion support arm 64, the sidewardly protruding portions 64e which form the other mounting portion for mounting the rigidity adjustment devices 90 are provided.

With such a configuration, the cushion support arm 64 can assist the starting of upward movement of the front wheels 13 of the rocking vehicle 10 and hence, the front wheel suspension device 12 can quickly respond to a change in a road surface thus providing the rocking vehicle (small-sized saddle riding vehicle) 10 (see FIG. 2) which enables a rider to enjoy light riding.

Figure 5:
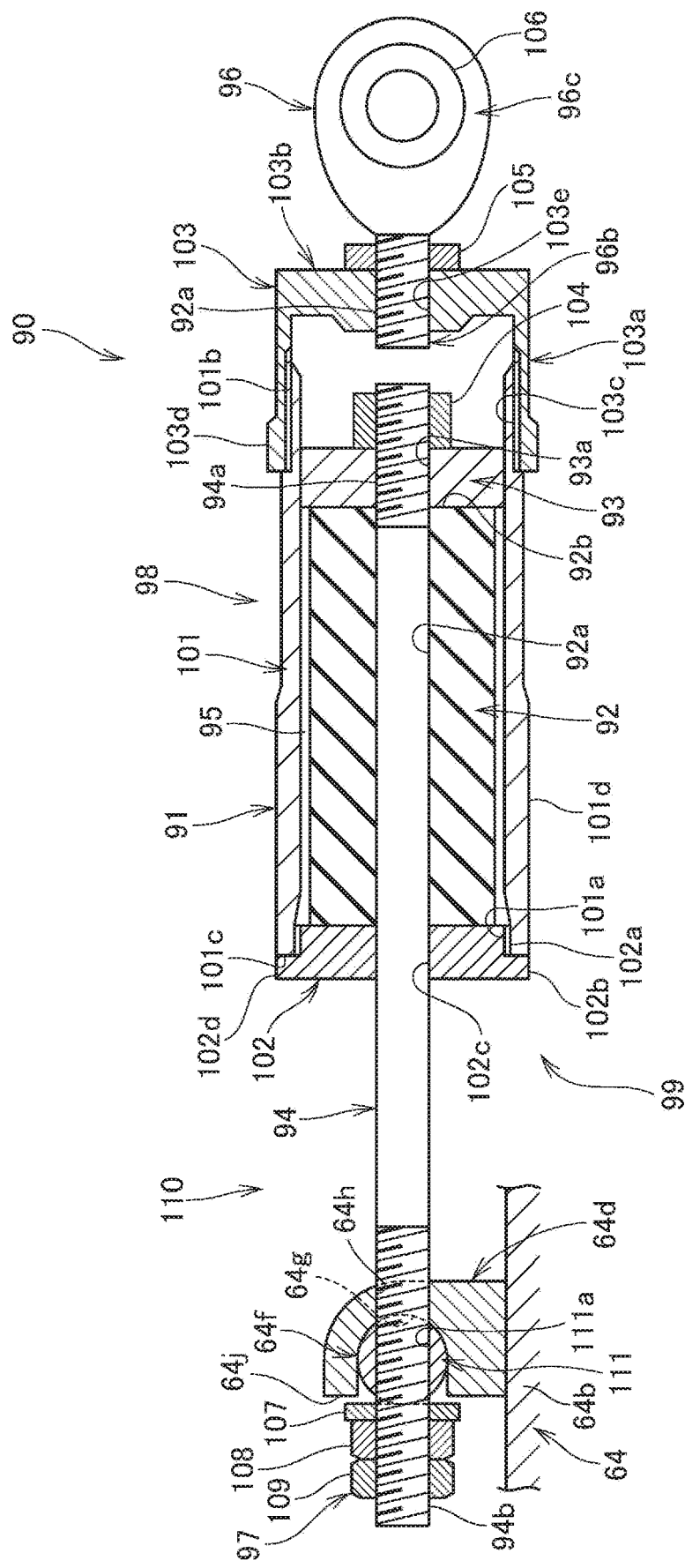
FIG. 5 is a cross-sectional view showing the rigidity adjustment device.

FIG. 5 is a cross-sectional view showing the rigidity adjustment device 90.

The rigidity adjustment device 90 includes a cylinder 91, a rubber member 92, a contact member 93, a rod 94, a cylinder-side connecting portion 96, and a rod-side connecting portion 97.

The cylinder 91 includes a cylinder body 101, a closure member 102, and a cap member 103.

The cylinder body 101 has a cylindrical shape. Female threads 101a are formed on an inner peripheral surface of one end portion of the cylinder body 101, and male threads 101b are formed on an outer peripheral surface of the other end portion of the cylinder body 101. A hexagonal-shaped tool engaging portion 101d with which a tool is engaged is formed on an outer peripheral surface of the cylinder body 101. The closure member 102 has: male threads 102a which are threadedly engaged with the female threads 101a formed on one end of the cylinder body 101; a flange portion 102b which has a larger diameter than the male threads 102a and is brought into contact with one end surface 101c of the cylinder body 101; and a through hole 102c which penetrates the male threads 102a and the flange portion 102b. The flange portion 102b has a tool engaging portion 102d having a hexagonal outer shape on an outer peripheral surface thereof. In mounting the closure member 102 on the cylinder body 101, a tool is engaged with the tool engaging portion 101d and another tool is engaged with the tool engaging portion 102d, and the tool engaging portion 101d and the tool engaging portion 102d are rotated relative to each other so that the closure member 102 can be threadedly engaged with the cylinder body 101.

The cap member 103 is a bottomed cylindrical member which is threadedly engaged with the cylinder body 101 for closing the other end of the cylinder body 101. The cap member 103 is formed of a cylinder portion 103a, and a bottom portion 103b which forms a bottom of the cylinder portion 103a. The cylinder portion 103a has female threads 103c which are threadedly engaged with the male threads 101b of the cylinder body 101, and a hexagonal tool engaging portion 103d which is formed on an outer peripheral surface of the cylinder portion 103a for rotating the cylinder portion 103a by making a tool engage with the tool engaging portion 103d. Female threads 103e are formed on the bottom portion 103b in a penetrating manner. In mounting the cap member 103 on the cylinder body 101, a tool is engaged with the tool engaging portion 101d and another tool is engaged with the tool engaging portion 103d, and the cylinder body 101 and the cap member 103 are rotated relative to each other so that the cap member 103 can be threadedly engaged with the cylinder body 101.

The rubber member 92 is a circular columnar member disposed in the inside of the cylinder 91, and a rubber through hole 92a which allows the rod 94 to pass therethrough is formed in the rubber member 92. An outer diameter of the rubber member 92 is smaller than an inner diameter of the cylinder body 101 so that a gap 95 is formed between an outer peripheral surface of the rubber member 92 and an inner peripheral surface of the cylinder body 101. As described later in detail, the gap 95 is a portion which allows the increase of an outer diameter of the compressed rubber member 92 at the time of generating a tensile force by the rigidity adjustment device 90.

The contact member 93 is a member which is brought into contact with an end surface 92b of the rubber member 92. Female threads 93a which are threadedly engaged with male threads 94a formed on an end portion of the rod 94 are formed on the contact member 93. One end side of the rod 94 passes through the through hole 102c formed in the closure member 102 and the rubber through hole 92a formed in the rubber member 92 and, then, the male threads 94a are threadedly engaged with the female threads 93a formed on the contact member 93. A lock nut 104 is threadedly engaged with the male threads 94a thus locking the threaded engagement between the contact member 93 and the rod 94.

The cylinder-side connecting portion 96 includes: a shaft portion 96b having male threads 96a which are threadedly engaged with the female threads 103e formed on the bottom portion 103b of the cap member 103; and a bearing portion 96c which is integrally formed with the shaft portion 96b. The bearing portion 96c includes a spherical sliding bearing 106. A lock nut 105 is threadedly engaged with the male threads 96a of the shaft portion 96b so that the threaded engagement between the cap member 103 and the shaft portion 96b is locked.

The rod-side connecting portion 97 is formed of: a washer 107 which is fitted on a distal end portion of the rod 94; and a nut 108 and a lock nut 109 which are threadedly engaged with distal-end-side male threads 94b formed on a distal end portion of the rod 94. The rod-side connecting portion 97 functions as a connecting member and also functions as a tension adjusting mechanism for adjusting a pre-tension. That is, the rubber member 92 can be compressed by tightening the nut 108 by way of the rod 94 and the contact member 93 so that it is possible to make the rigidity adjustment device 90 generate a pre-tension and also increase or decrease the generated pre-tension. Further, the rubber member 92 exhibits a large hysteresis load at the time of deformation and hence, the rubber member 92 can also contribute to the attenuation of vibration.

The rod-side connecting portion 97 is connected to the upper protruding portion 64d of the cushion support arm 64 by way of a connecting pin 111. A pin through hole 111a which allows the rod 94 to pass therethrough is formed in the connecting pin 111.

The upper protruding portion 64d of the cushion support arm 64 (to be more specific, the right arm 64) has: a pin groove 64f in which the connecting pin 111 is inserted; and a protruding portion through hole 64h which is formed in a bottom surface 64g having a circular arcuate cross section on the pin groove 64f for allowing the rod 94 to pass therethrough. The pin groove 64f is formed on a side surface 64j of the upper protruding portion 64d on a side opposite to the cylinder 91 (that is, a side where the upper protruding portion 64d faces the washer 107)

As described above, by forming the bottom surface 64g of the pin groove 64f into an arcuate shape in cross section, the rod 94 can be made rockable with respect to the upper protruding portion 64d.

The cylinder 91, the rubber member 92 and the contact member 93 described above form a cylinder body 98. The rod 94, the rod-side connecting portion 97, the lock nut 104 form a rod assembly 110. The cylinder body 98 and the rod assembly 110 form a cylinder rod assembly 99.

As has been described heretofore, the rigidity adjustment device 90 possesses both a tension generation function and a vibration attenuation function. Accordingly, starting of the movement in the upward direction of the front wheel 13 (see FIG. 2) can be made quicker and, at the same time, vibration of the vehicle body which is generated thereafter can be converged.

Further, the rigidity adjustment device 90 exhibits the generation of tension and the attenuation of vibration due to the rubber member 92. Accordingly, it is possible to acquire an advantageous effect of making starting of the upward movement of the front wheel 13 quicker with the inexpensive and simple structure and, it is also possible to acquire an advantageous effect of attenuating vibration of the vehicle body which is generated thereafter.

As shown in the above-mentioned FIG. 2 and FIG. 5, the rigidity adjustment device 90 of the body frame 11 of the rocking vehicle 10 which forms a small-sized vehicle is configured to apply a pre-tension to the mounting portion of the front wheel suspension device 12 of the rocking vehicle 10 including the front wheel suspension device 12 which connects the body frame 11 and the front wheels 13 to each other such that an upward pre-force is generated. The rigidity adjustment device 90 includes: the cylinder 91; the rod 94 which penetrates one end portion of the cylinder 91 and extends from the inside of the cylinder 91 to the outside of the cylinder 91; and the contact member 93 which is formed on one end portion of the rod 94 in the inside of the cylinder 91 and is formed as a plate-like member moving inside the cylinder 91 integrally with the rod 94. The rubber member 92 which forms an elastic member is disposed between the contact member 93 and the one end portion of the cylinder 91. The mounting portion for mounting on a body frame 11 side is provided to the other end portion of the rod 94 and the other end portion of the cylinder 91 respectively, and the tension adjusting mechanism (in this embodiment, the rod-side connecting portion 97) is provided to the rod 94 and the cylinder 91 or either one of the rod 94 or the cylinder 91.

Such a configuration is suitable for making starting of the upward movement of the front wheel 13 quicker, and it is possible to provide the rigidity adjustment device 90 which can be easily mounted on the vehicle body and can easily adjust rigidity with a simple configuration.

The elastic member is formed of the rubber member 92 and hence, the elastic member has both a tension generation function and a vibration attenuation function. Accordingly, starting of the upward movement of the front wheel 13 can be made quicker and, at the same time, a vibration attenuating effect after the upward movement of the front wheel 13 can be expected and, further, the rigidity adjustment device 90 can be provided at a low cost.

Figure 6A:
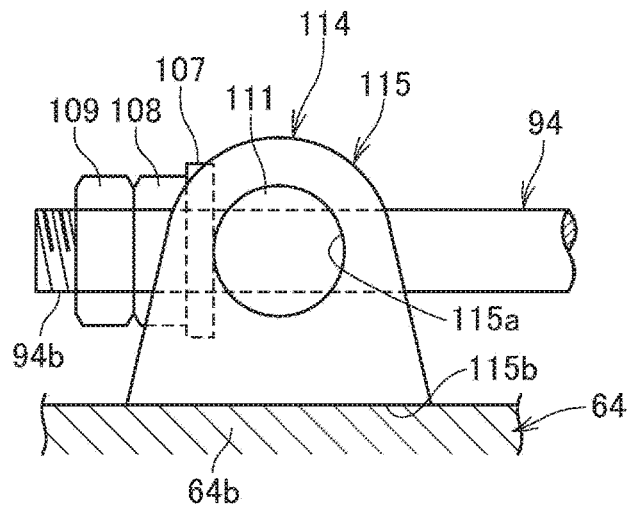
Figure 6B:
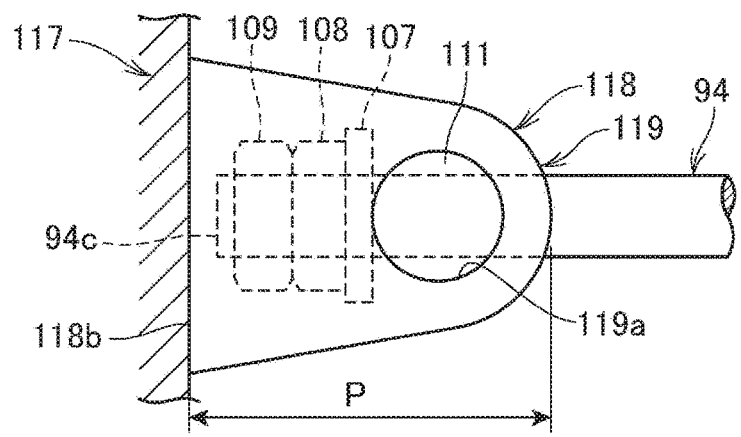
Figure 6C:
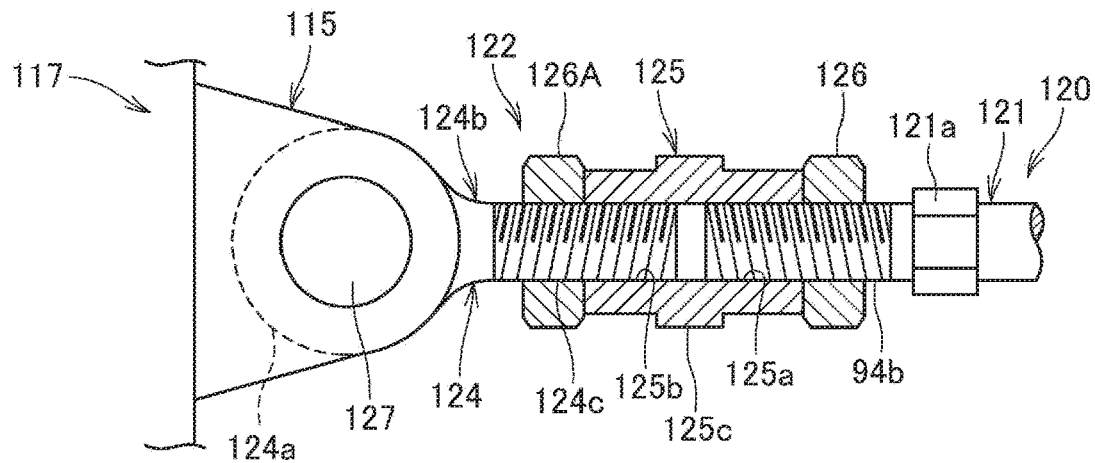

FIG. 6A to FIG. 6C are explanatory views showing the connecting portion to which one end of the rigidity adjustment device 90 is connected.

FIG. 6A is a side view showing a rod support portion 114 formed on the cushion support arm 64.

The rod support portion 114 which forms an upwardly protruding connecting portion is formed on an upper portion of the right arm 64b of the cushion support arm 64.

The rod support portion 114 is formed of: a pair of plate-like support brackets 115 (only the support bracket 115 as viewed from a viewer's side shown in the drawing); and a connecting pin 111 which is inserted into pin insertion holes 115a formed in the pair of support brackets 115 respectively.

The pair of support brackets 115 is disposed parallel to each other in a front and back direction perpendicular to a paper plane on which the drawing is described.

The support bracket 115 is formed such that a width of the support bracket 115 in the longitudinal direction of the rod 94 of the rigidity adjustment device 90 (see FIG. 5) is gradually widened as the support bracket 115 extends downward. The pair of support brackets 115 may be integrally formed with the cushion support arm 64, or may be formed as parts separate from the cushion support arm 64 and bottom surfaces 115b of the support brackets 115 are joined to the right arm 64b by welding or the like.

The pair of support brackets 115 is disposed with a distance therebetween such that the support brackets 115 do not obstruct the arrangement of the washer 107 and the rotation of the nut 108 and the lock nut 109 performed by engaging a tool with the nut 108 and the lock nut 109.

The rod support portion 114 is used when the rod 94 is extended so as to be directed in an approximately extending direction of the cushion support arm 64.

FIG. 6B is a side view showing a rod support portion 118 which forms a connecting portion provided to a rigid member 117 extending in the vertical direction, and the rod support portion 118 protruding sideward is provided to a side surface of the rigid member 117.

The rod support portion 118 is formed of: a pair of plate-like support brackets 119 (only the support bracket 119 on a viewer's side shown), and a connecting pin 111 which is inserted into pin insertion holes 119a formed in the pair of support brackets 119 respectively.

The pair of support brackets 119 are disposed parallel to each other in a front and back direction perpendicular to a paper plane on which the drawing is described.

A width of the support bracket 119 in a direction orthogonal to the rod 94 of the rigidity adjustment device 90 (see FIG. 5) is gradually widened as the support bracket 119 approaches the rigid member 117. A protrusion amount P of the support bracket 119 from the rigid member 117 is set such that a distal end surface 94c of the rod 94 is not brought into contact with the rigid member 117 in a state where the rod 94 is connected to the rod support portion 118 by way of the connecting pin 111.

The support brackets 119 may be integrally formed with the rigid member 117, or may be formed as parts separate from the rigid member 117 and bottom surfaces 119b of the support brackets 119 are joined to the rigid member 117 by welding or the like.

The pair of support brackets 119 is disposed with a distance therebetween such that the pair of support brackets 119 do not obstruct the arrangement of the washer 107 and the rotation of the nut 108 and the lock nut 109 performed by engaging a tool with the nut 108 and the lock nut 109.

The rod support portion 118 is used when the rod 94 and the rigid member 117 are disposed orthogonal to each other or approximately orthogonal to each other.

FIG. 6C is a side view showing a connecting structure between a rod 121 of a rigidity adjustment device 120 according to a modification of the rigidity adjustment device 90 and the rod support portion 114 with a part in cross section.

The rigidity adjustment device 120 differs from the rigidity adjustment device 90 (see FIG. 5) only with respect to the rod 121. That is, the rigidity adjustment device 120 includes: a cylinder body 98 (see FIG. 5); a cylinder-side connecting portion 96 (see FIG. 5); the rod 121 extending from the cylinder body 98; and a rod-side connecting portion 122 which is formed on a distal end portion of the rod 121.

An assembled structure of the rod 121 to the cylinder body 98 is equal to the corresponding assembled structure of the rigidity adjustment device 90 (see FIG. 5).

The rod 121 has: distal-end-side male threads 94b formed on a distal end portion of the rod 121 as right-handed threads; and a hexagonal-shaped tool engaging portion 121a formed on a cylinder body 98 side of male threads 94b on a distal end side.

The rod-side connecting portion 122 is formed of: a connecting member 124 connected to the pair of support brackets 115 provided to the rigid member 117; a nut member 125 threadedly engaged with the connecting member 124 and the rod 121 respectively; a pair of lock nuts 126, 126A threadedly engaged with the distal-end-side male threads 94b of the rod 121 and the male threads 124c of the connecting member 124 respectively for locking the nut member 125; and a connecting pin 127 connecting the connecting member 124 and the pair of support brackets 115 to each other.

The connecting member 124 is formed of: a ring portion 124a connected to the pair of support brackets 115 by way of the connecting pin 127; and a shaft portion 124b extending from the ring portion 124a. The connecting pin 127 is inserted into the ring portion 124a. Male threads 124c which form left-handed threads are formed on a distal end side of the shaft portion 124b.

The nut member 125 has, on an inner peripheral surface thereof, female threads 125a which form right-handed thread with which the distal-end-side male threads 94b of the rod 121 are threadedly engaged, and female threads 125b which form left-handed threads with which the male threads 124c of the connecting member 124 are threadedly engaged. Further, on an outer peripheral surface of the nut member 125, a hexagonal-shaped tool engaging portion 125c with which a tool is engaged is formed.

By making tools engage with the above-mentioned tool engaging portion 121a and the tool engaging portion 125c respectively and by rotating the rod 121 and the connecting member 124 and the nut member 125 relative to each other, a pre-tension of the rigidity adjustment device 120 can be adjusted. This adjustment of a pre-tension can be performed after completely fixing both ends of the rigidity adjustment device 120.

Second Embodiment

Figure 7:
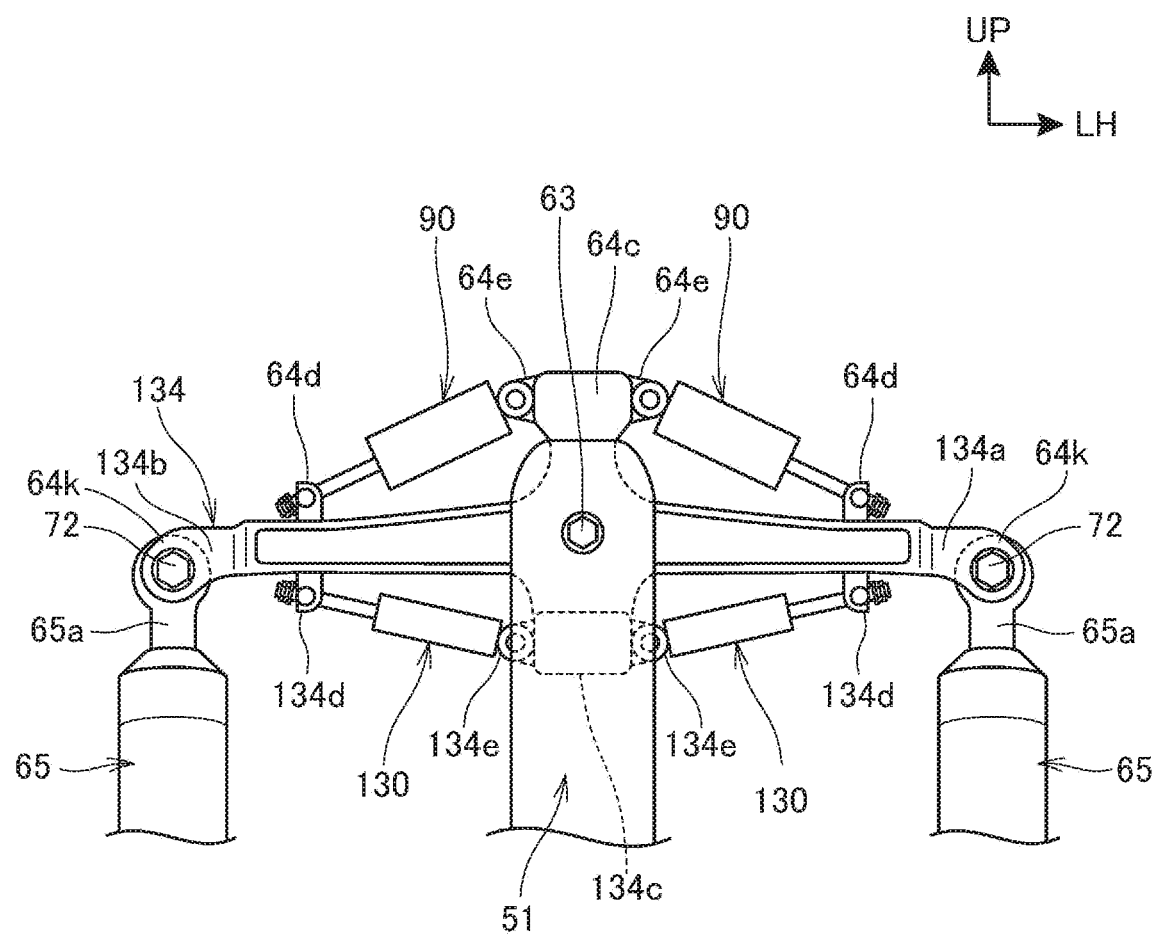
FIG. 7 is a front view showing a main part of a rocking vehicle provided with a rigidity adjustment device according to a second embodiment.

FIG. 7 is a front view showing a main part of a rocking vehicle including rigidity adjustment devices 90, 130 according to a second embodiment.

In the second embodiment, configurations identical to the corresponding configurations in the first embodiment are given the same symbols, and their detailed description is omitted.

A cushion support arm 134 is supported by a rocking shaft 63 disposed on an upper portion of a front suspension frame 51 in a vertically rockable manner so as to extend in the vehicle width direction.

On both end portions of the cushion support arm 134, to be more specific, on left and right cushion support portions 64k, upper end portions of cushion units 65 are mounted in a rockable manner by way of upper connecting pins 72 respectively.

The cushion support arm 134 is an integral body formed of: a left arm 134a and a right arm 134b which extend leftward and rightward respectively with the rocking shaft 63 as a boundary; an upwardly extending portion 64c which extends upward at a position above the rocking shaft 63; and a downwardly extending portion 134c which extends downward at a position below the rocking shaft 63.

On a lower portion of the downwardly extending portion 134c, a pair of left and right sidewardly protruding portions 134e protruding outward in the vehicle width direction is integrally formed.

With respect to the left arm 134a and the right arm 134b, upper protruding portions 64d, 64d are integrally formed on upper portions of the left arm 134a and the right arm 134b inside upper connecting pins 72 in the vehicle width direction respectively, and lower protruding portions 134d, 134d are integrally formed on lower portions of the left arm 134a and the right arm 134b inside the upper connecting pins 72 in the vehicle width direction respectively.

On the left upper protruding portion 64d and the left sidewardly protruding portion 64e and on the right upper protruding portion 64d and the right sidewardly protruding portion 64e, the rigidity adjustment device 90 for adjusting rigidity of the cushion support arm 134 is mounted respectively.

On the left lower protruding portion 134d and the left sidewardly protruding portion 134e and on the right lower protruding portion 134d and the right sidewardly protruding portion 134e, the second rigidity adjustment device 130 for adjusting rigidity of the cushion support arm 134 is mounted respectively.

Although the second rigidity adjustment device 130 has the same basic structure as the rigidity adjustment device 90, an outer diameter of a rubber member and an inner diameter of a cylinder which accommodates the rubber member are smaller than an outer diameter of a rubber member and an inner diameter of a cylinder of the rigidity adjustment device 90. Accordingly, a tension which the second rigidity adjustment device 130 can generate is smaller than a tension of the rigidity adjustment device 90.

The second rigidity adjustment devices 130 are mounted between the left lower protruding portion 134d and the left sidewardly protruding portion 134e and between the right lower protruding portion 134d and the right sidewardly protruding portion 134e respectively such that a tensile force acts between the left lower protruding portion 134d and the left sidewardly protruding portion 134e and between the right lower protruding portion 134d and the right sidewardly protruding portion 134e respectively. With such a configuration, also in the downward returning of the front wheels 13 after the upward movement of the front wheels 13, hysteresis can be decreased and hence, the front wheels 13 are smoothly lowered thus enhancing ground contact feeling during traveling. These advantageous effects were confirmed by functional tests during traveling of the vehicle on which the second rigidity adjustment device 130 is actually mounted.

As shown in FIG. 3 and FIG. 7 described above, the rocking vehicle includes the plurality of rigidity adjustment devices 90, 130. That is, the rocking vehicle includes: the rigidity adjustment devices 90 which form the first rigidity adjustment devices each of which generates a pre-force component in the same direction as the upward moving direction of the front wheel 13 due to a reaction force of the front wheel 13 from a road surface on the cushion support portion 64k; and the second rigidity adjustment devices 130 each of which generates a pre-force component in the same direction as the downward moving direction of the front wheel 13 due to a reaction force of the front wheel 13 from a road surface.

With such a configuration, starting of the upward movement of the front wheel 13 can be made quicker and, at the same time, the downward movement of the front wheel 13 is also assisted thus enabling quick response and smooth vertical movement of the front wheel 13.

Further, a movement speed of the front wheel 13 in the vertical direction is adjusted by making a pre-tension of the rigidity adjustment device 90 and a pre-tension of the second rigidity adjustment device 130 different from each other. Accordingly, it is possible to provide the rocking vehicle (small-sized saddle riding vehicle) 10 including the front wheel suspension device 12 (see FIG. 3) which exhibits high performance in conformity with a characteristic of a vehicle.

Third Embodiment

Figure 8:
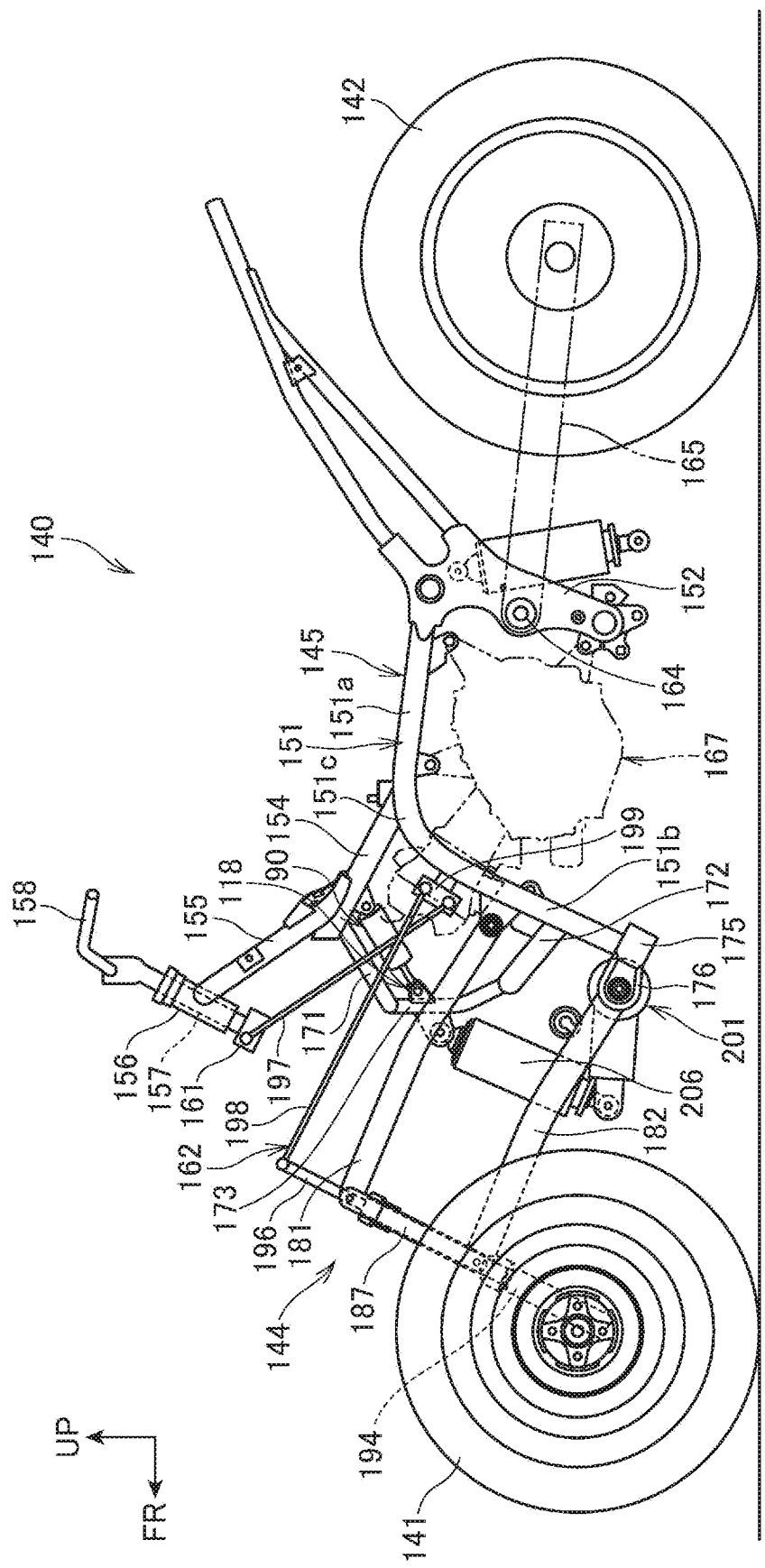
FIG. 8 is a left side view showing a rocking vehicle according to a third embodiment.
Figure 9:
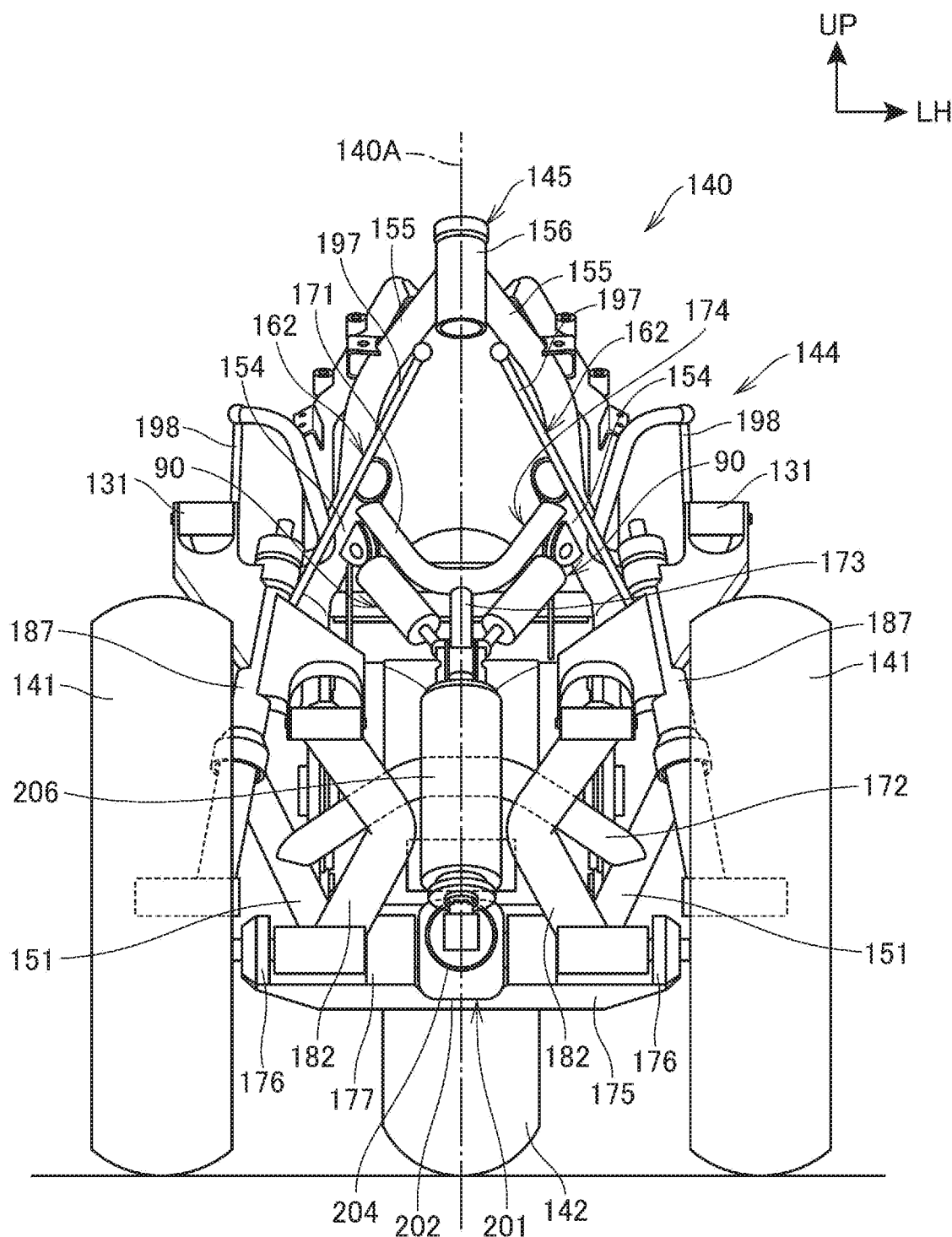
FIG. 9 is a front view showing a rocking vehicle 140.
Figure 10:
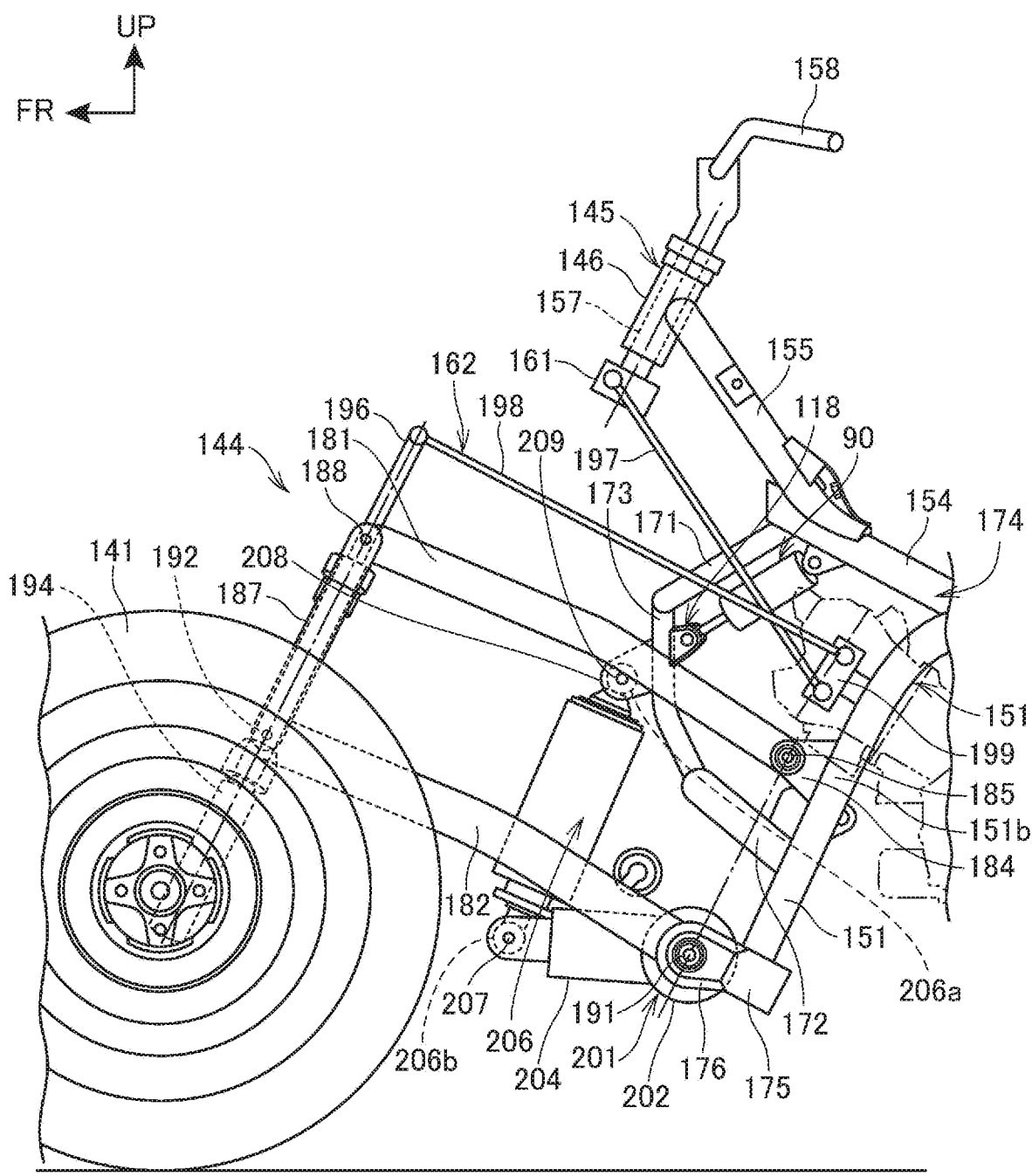
FIG. 10 is an enlarged view of a main part of the rocking vehicle shown in FIG. 8.

FIG. 8 is a left side view showing a rocking vehicle 140 according to a third embodiment, FIG. 9 is a front view showing the rocking vehicle 140, and FIG. 10 is an enlarged view of a main part in FIG. 8.

As shown in FIG. 8 to FIG. 10, the rocking vehicle 140 is a saddle-riding-type three-wheeled vehicle (small-sized vehicle) which includes a pair of left and right front wheels 141 provided to a front portion of a vehicle body, and a single rear wheel 142 which is provided to the center of a rear portion of the vehicle body in a vehicle width direction.

The rocking vehicle 140 is configured such that left and right front wheels 141, 141 can be inclined in the same manner as a body frame 145 and the rear wheel 142 by the action of the front wheel suspension device 144.

The body frame 145 includes a pair of left and right center pipes 151 and a pair of left and right pivot frames 152.

Each of the left and right center pipes 151 includes: an upper side portion 151a extending in the longitudinal direction of the vehicle; and a front side portion 151b extending from a front end portion of the upper side portion 151a after being bent in an oblique frontward and downward direction.

A pair of left and right extension pipes 154 extends in an oblique upward and frontward direction from bent portions 151c of the left and right center pipes 151, and a pair of left and right head support pipes 155 extends in an oblique upward and frontward direction from front end portions of the left and right extension pipes 154, and a head pipe 156 is supported by the left and right head support pipes 155.

A steering shaft 157 is supported on the head pipe 156 in a rotatable manner. A handlebar 158 is mounted on an upper end portion of the steering shaft 157.

A bottom bracket 161 is mounted on a lower end portion of the steering shaft 157, and a steering link 162 is connected to the bottom bracket 161.

The left and right pivot frames 152 extend downward from rear end portions of the left and right center pipes 151 respectively. A swing arm 165 is supported on the left and right pivot frames 152 in a vertically rockable manner by way of a pivot shaft 164, and the rear wheel 142 is supported on a rear end portion of the swing arm 165.

An engine 167 is disposed in a space surrounded by the left and right center pipes 151 and the left and right pivot frames 152.

Both end portions of hanger pipes 171 which are inclined in a frontward and downward direction are connected to front end portions of the left and right extension pipes 154 respectively. Further, both end portions of a lower pipe 172 which is inclined in a frontward and upward direction are connected to front end portions of the left and right center pipes 151 respectively. A single cushion support pipe 173 is mounted between a lower end portion of the hanger pipe 171 and an upper end portion of the lower pipe 172 in a bridging manner.

The left and right center pipes 151, the left and right extension pipes 154, the hanger pipe 171, the lower pipe 172, and the cushion support pipe 173 form a front portion frame 174 which forms a rigid member.

A lower frame 175 extending in a vehicle width direction is mounted on front end portions of the left and right center pipes 151 in a bridging manner. Rear lower mount portions 176 are provided to both end portions of the lower frame 175 respectively. A lower center mount portion 177 is provided to the center of the lower frame 175 in the vehicle width direction.

The front wheel suspension device 144 is configured such that a double-wishbone-type suspension device is rotated approximately horizontally by 90 degrees, and an upper arm 181 and a lower arm 182 are disposed such that the upper arm 181 and the lower arm 182 extend in a vehicle longitudinal direction.

The upper arm 181 and the lower arm 182 are respectively disposed in pair on left and right sides, and the left and right front wheels 141 are supported by the left and right upper arms 181 and the left and right lower arms 182 respectively.

Rear end portions of the left and right upper arm 181 are supported by rear upper mount brackets 184 mounted on front side portions 151b of the left and right center pipes 151 respectively in a vertically rockable manner by way of rear upper rocking shafts 185 respectively. Upper portions of steering pipes 187 which respectively support the front wheels 141 are supported on front end portions of the left and right upper arms 181 in a vertically rockable manner by way of front upper rocking shafts 188 respectively.

Rear end portions of the left and right lower arms 182 are supported by rear lower mount portions 176 and a lower center mount portion 177 in a vertically rockable manner by way of rear lower rocking shafts 191 respectively. Lower portions of the steering pipes 187 are respectively supported by front end portions of the left and right lower arms 182 in a vertically rockable manner by way of front lower rocking shafts 192 respectively.

The upper arms 181 and the lower arms 182 are respectively disposed in a frontwardly and upwardly inclined manner as viewed in a side view of the vehicle.

A knuckle shaft 194 is coaxially and rotatably made to pass through and supported by the left and right steering pipes 187 respectively. The left and right knuckle shafts 194 respectively extend below the steering pipes 187, a hub portion (not shown in the drawing) is rotatably mounted on the left and right knuckle shafts 194 respectively, and the front wheels 141 are mounted on the hub portions respectively. A link arm 196 for connecting the steering link 162 is mounted on upper end portions of left and right steering pipes 187 respectively.

The left and right knuckle shafts 194 are configured to rotate about axes of the steering pipes 187 respectively due to an operation of the handlebar 158 so that the front wheels 141 are steered.

Each of the left and right steering link 162 includes a first link rod 197, a second link rod 198, and a rocker arm portion 199.

The first link rod 197 has a front end portion thereof connected to the bottom bracket 161 of the steering shaft 157 and, at the same time, extends from the bottom bracket 161 toward the center pipe 151. The second link rod 198 has a front end portion thereof connected to the link arm 196 and, at the same time, extends from the link arm 196 toward the center pipe 151. The rocker arm portion 199 is rotatably supported by the left and right center pipes 151, and a rear end portion of the first link rod 197 and a rear end portion of the second link rod 198 are connected to the rocker arm portion 199 respectively.

When the handlebar 158 is steered leftward from a state where a steering angle of the left and right front wheels 141 is 0°, the left second link rod 198 is used as a push rod and, at the same time, the right second link rod 198 is used as a pull rod. As a result, the left and right link arms 196, the left and right steering pipes 187, and the left and right knuckle shafts 194 are rotated leftward so that the left and right front wheels 141 are steered leftward.

Meanwhile, when the handlebar 158 is steered rightward, the right second link rod 198 is used as a push rod and, at the same time, the left second link rod 198 is used as a pull rod. As a result, the left and right link arms 196, the left and right steering pipes 187, and the left and right rocker arm portions 199 are rotated rightward so that the left and right front wheels 141 are steered rightward.

On the lower center mount portion 177 of the lower frame 175, a differential gear mechanism 201 which absorbs the difference in rocking speed between the left and right lower arms 182 is supported.

A gear case 202 of the differential gear mechanism 201 has an outer case (not shown in the drawing), and a cushion support portion 204 is integrally formed on a front portion of the outer case.

A lower end portion 206b of a cushion unit 206 is rockably supported by the cushion support portion 204 by way of a cushion lower support shaft 207. An upper end portion 206a of the cushion unit 206 is rockably supported by a cushion upper support bracket 208 mounted on the cushion support pipe 173 by way of a cushion upper support shaft 209. The cushion unit 206 strokes along with the vertical movement of the left and right front wheels 141 with respect to the body frame 145.

As viewed in a front view, the cushion unit 206 is disposed on a vehicle body center line 140A extending in the vertical direction while passing the center in the vehicle width direction.

On the front portion frame 174 which forms a rigid member, to be more specific, between the left and right extension pipes 154 of the front portion frame 174 and the cushion support pipe 173, the pair of left and right rigidity adjusting devices 90 are mounted. The left and right rigidity adjusting devices 90 generate a tensile force between the left and right extension pipes 154 and the cushion support pipe 173 thus applying a pre-tension. With such a configuration, a hysteresis loss of the front portion frame 174 can be decreased and hence, starting of deflection of the front portion frame 174 against a force from a road surface in a jolting direction can be made quicker, the front portion frame 174 having the cushion upper support bracket 208 which is a support portion for the front wheel suspension device 144. Accordingly, the cushion upper support bracket 208 of the front wheel suspension device 144 can be effectively displaced in an upward direction with a quick response such that starting of upward movement of the left and right front wheels 141 is assisted.

Fourth Embodiment

Figure 11:
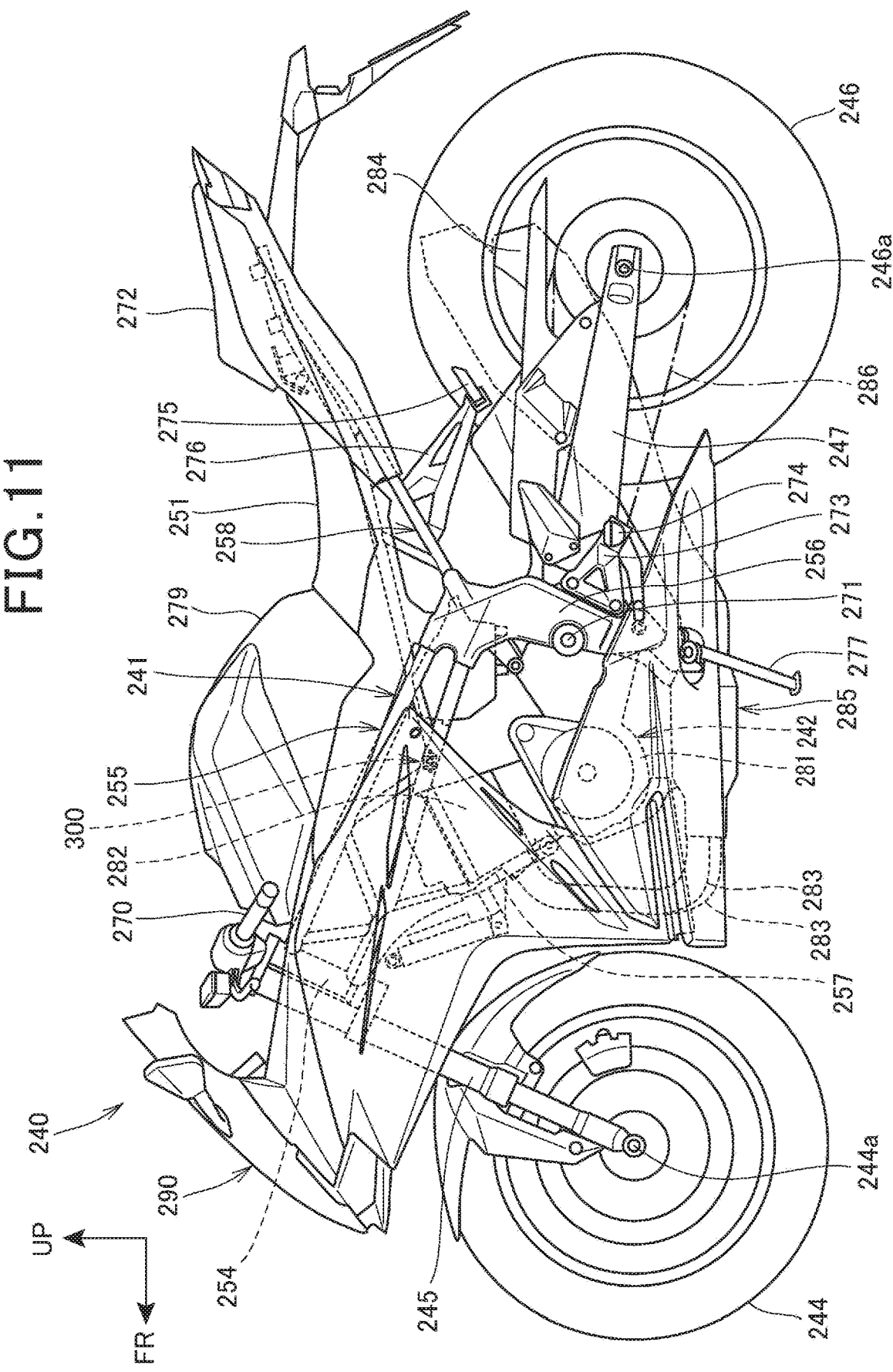
FIG. 11 is a left side view showing a motorcycle according to a fourth embodiment of the present invention.

FIG. 11 is a left side view showing a motorcycle 240 according to a fourth embodiment of the present invention.

The motorcycle 240 is a vehicle where an engine 242 is supported by a body frame 241, a front fork 245 which forms a suspension device for supporting a front wheel 244 is steerably supported by a front end of the body frame 241, and a swing arm 247 which supports a rear wheel 246 is provided to a rear portion of the body frame 241.

The motorcycle 240 is a small-sized saddle riding vehicle where a rider's seat 251 on which a rider rides in a straddling manner is disposed above a rear portion of the body frame 241.

Figure 12:
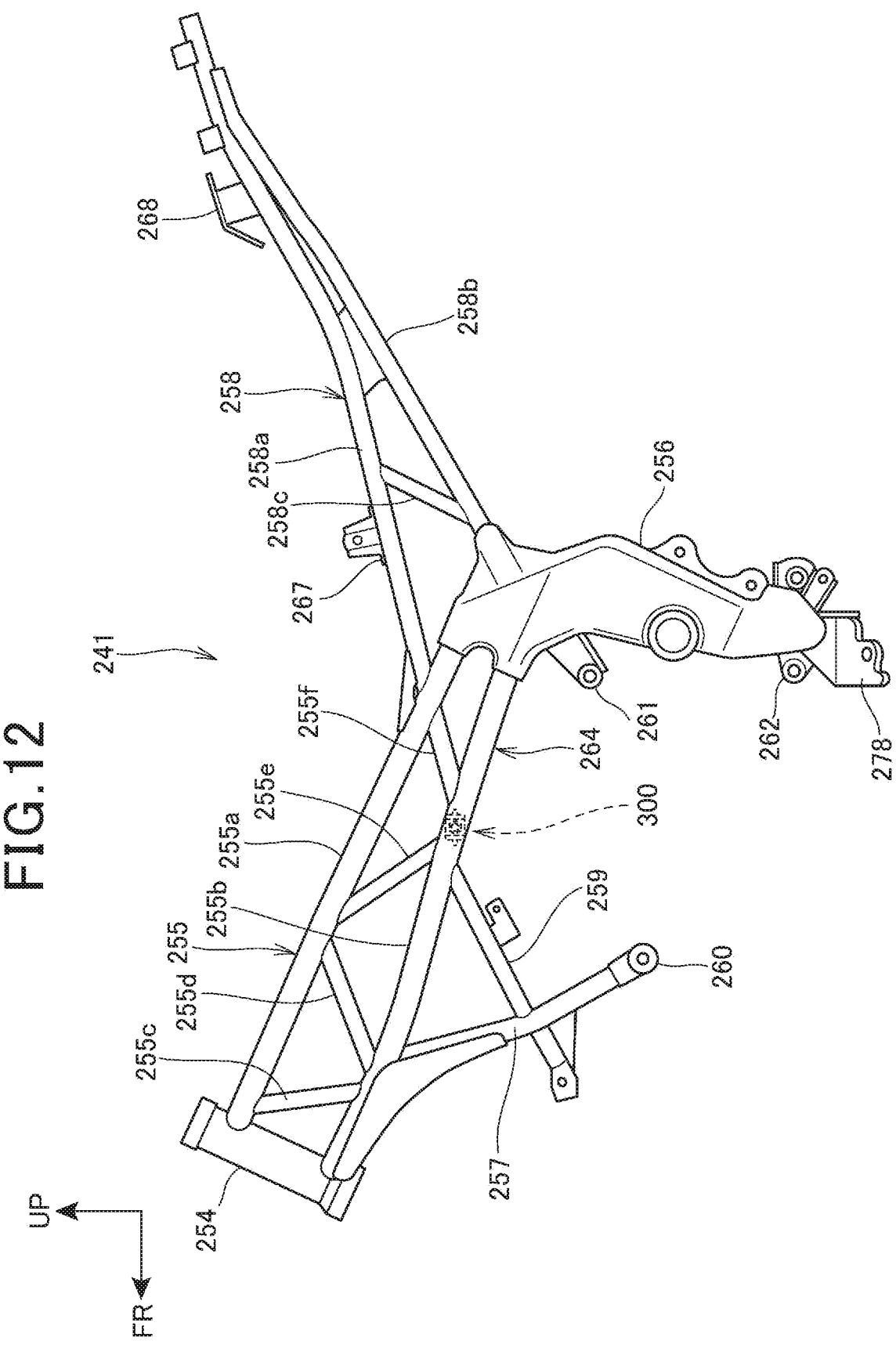
FIG. 12 is a left side view showing a body frame.
Figure 13:
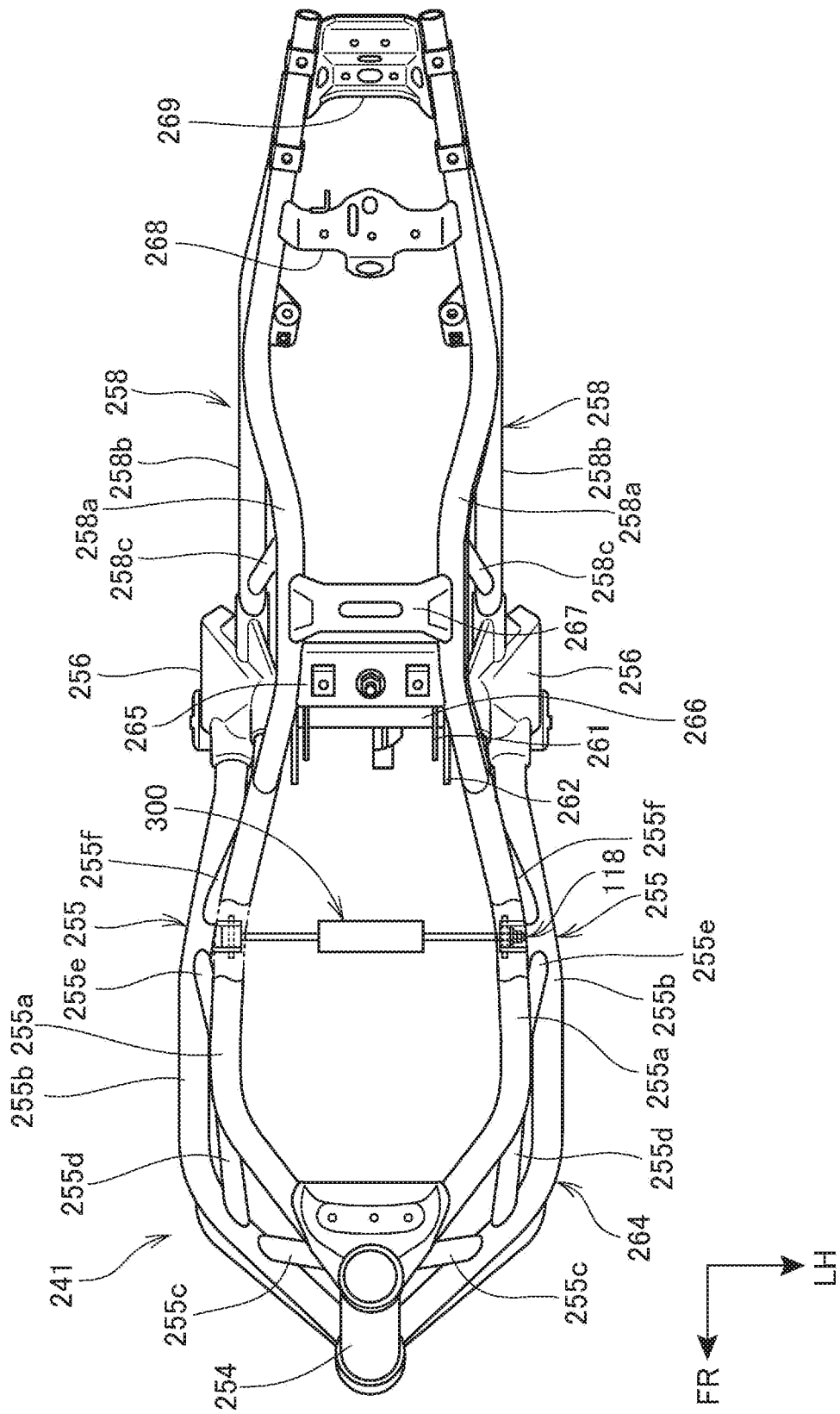
FIG. 13 is a plan view showing the body frame.

FIG. 12 is a left side view showing the body frame 241. FIG. 13 is a plan view showing the body frame 241.

As shown in FIG. 12 and FIG. 13, the body frame 241 includes a head pipe 254, a pair of left and right main frames 255, a pair of left and right pivot frames 256, a pair of left and right down frames 257, and a pair of left and right seat frames 258.

The head pipe 254 is provided to a front end of the body frame 241, and supports a front fork 245 (see FIG. 1). The left and right main frames 255 extend in an oblique rearward and downward direction from left and right sides of the head pipe 254. The left and right pivot frames 256 extend downward from rear ends of the left and right main frames 255 respectively. The left and right down frames 257 extend in an oblique rearward and downward direction from front end portions of the left and right main frames 255 (to be more specific, left and right lower frame portions 255*b* described in detail later) respectively. The left and right seat frames 258 extend in a rearward and upward direction from rear portions of the left and right main frames 255 and upper portions of the left and right pivot frames 256 respectively.

Each of the left and right main frames 255 has: an upper frame portion 255*a* which connects an upper portion of the head pipe 254 and an upper portion of the pivot frame 256 to each other; and a lower frame portion 255*b* which connects a lower portion of the head pipe 254 and an upper portion of the pivot frame 256 to each other. As viewed in a plan view, the upper frame portion 255*a* extends along the lower frame portion 255*b* inside the lower frame portion 255*b* in the vehicle width direction.

The left and right main frames 255 have a plurality of connecting frame portions 255*c*, 255*d*, 255*e*, 255*f* which connect the upper frame portion 255*a* and the lower frame portion 255*b* to each other in a vertical direction so as to form a truss-like triangular shape.

That is, the respective main frames 255 form a truss frame where the upper frame portion 255*a* and the lower frame portion 255*b* are connected to each other by the truss-shaped connecting frame portions 255*c*, 255*d*, 255*e*, 255*f*. Further, as viewed in a plan view, rear portions of the left and right main frames 255 positioned below the rider's seat 251 (see FIG. 11) are formed to have a width narrower than front portions of the left and right main frames 255 supporting the engine 242 (see FIG. 11) in the vehicle width direction.

Each of the left and right seat frames 258 has an upside seat frame portion 258*a*, a sub frame portion 258*b*, and a reinforcing frame portion 258*c*.

The upside seat frame portion 258*a* extends rearward and upward from a rear portion of the upper frame portion 255*a*. The sub frame portion 258*b* extends rearward and upward from an upper portion of the pivot frame 256 and is connected to a rear end portion of the upside seat frame portion 258*a*. The reinforcing frame portion 258*c* connects the upside seat frame portion 258*a* and the sub frame portion 258*b* to each other in a vertical direction.

The body frame 241 includes a pair of left and right reinforcing frames 259 which extends rearward and upward from intermediate portions of the left and right down frames 257 in the vertical direction and is connected to the lower frame portion 255*b*.

Each of the left and right down frames 257 includes an engine hanger 260 on a lower end portion thereof.

The body frame 241 includes an upper portion cross frame 265, a lower portion cross frame 266, and an upper surface side cross frame 267.

The upper portion cross frame 265 connects upper end portions of the left and right pivot frames 256 to each other in the vehicle width direction. The lower portion cross frame 266 connects lower end portions of the left and right pivot frames 256 to each other in the vehicle width direction. The upper surface side cross frame 267 connects front portions of the left and right upside seat frame portions 258*a* to each other in the vehicle width direction behind the upper portion cross frame 265.

Further, the body frame 241 includes: a rear portion cross frame 268 which connects rear portions of the left and right upside seat frame portions 258*a* to each other in the vehicle width direction; and a rear end cross frame 269 which connects rear ends of the left and right upside seat frame portions 258*a* to each other in the vehicle width direction.

The upper portion cross frame 265 includes an engine hanger 261 which protrudes frontward. Further, the lower portion cross frame 266 includes an engine hanger 262 which protrudes frontward.

The head pipe 254, left and right lower frame portions 255*b*, left and right pivot frames 256, upper portion cross frame 265 and lower portion cross frame 266 described above form an annular frame 264 as a rigid member.

A rigidity adjustment device 300 is extended between the left and right lower frame portions 255*b* so as to extend in the vehicle width direction. The rigidity adjustment device 300 has the same basic structure as the rigidity adjustment device 90. The rigidity adjustment device 300 applies a pre-tension such that a tensile force is generated inward between left and right lower frame portions 255*b* which form the annular frame 264 as a rigid member.

In FIG. 11, a rider seated on the rider's seat 251 steers the front wheel 244 by way of a handlebar 270 which is mounted on an upper end of the front fork 245. The front wheel 244 is supported by a front wheel axle 244*a* which is provided to a lower end portion of the front fork 245.

A front end portion of the swing arm 247 is supported by a pivot shaft 271 which connects the left and right pivot frames 256 to each other in the vehicle width direction so that the swing arm 247 rocks in the vertical direction about the pivot shaft 271. The swing arm 247 and the body frame 241 are connected to each other by way of a rear cushion unit (not shown in the drawing). The rear wheel 246 is supported by a rear wheel axle 246*a* which is made to pass through a rear end portion of the swing arm 247.

The rider's seat 251 is supported by front portions of the left and right upside seat frame portions 258*a*. A pillion passenger's seat 272 on which a pillion passenger sits is disposed behind the rider's seat 251.

A fuel tank 279 is disposed above the left and right main frames 255 in a state where the fuel tank 279 is continuously formed with a front edge of the rider's seat 251.

A pair of left and right step holders 273 which extends rearward is provided to rear lower portions of the left and right pivot frames 256 respectively. A pair of left and right main steps 274 on which a rider sitting on the rider's seat 251 can place his feet is mounted on the left and right step holders 273 respectively, and is disposed behind the left and right pivot frames 256 respectively.

A pair of left and right tandem steps 275 on which a pillion passenger sitting on the pillion passenger's seat 272 places his feet is supported by a pair of left and right tandem step holders 276 extending rearward and downward from the left and right seat frames 258 respectively.

A side stand 277 is supported by a stand support portion 278 (see FIG. 12) which is provided to a lower portion of the left pivot frame 256.

The engine 242 includes a crankcase 281, and a cylinder portion 282 which extends upward from an upper surface of a front portion of the crankcase 281. A transmission (not shown in the drawing) is incorporated in a rear portion of the crankcase 281.

The engine 242 is supported by engine hangers 260, 261, 262 (see FIG. 12). The engine 242 is supported by the body frame 241 in a suspended manner, and is disposed below the left and right main frames 255 in front of the left and right pivot frames 256.

An exhaust unit 285 including an exhaust pipe 283 and a muffler 284 is connected to the cylinder portion 282. The exhaust pipe 283 is connected to a front surface of the cylinder portion 282, and extends rearward while passing below the crankcase 281. An output of the engine 242 is transmitted to the rear wheel 246 by a drive chain 286 which is extended between and wound around an output shaft side of the above-mentioned transmission and the rear wheel 246.

The motorcycle 240 includes a vehicle body cover 290 which covers a vehicle body formed of the body frame 241, the engine 242 and the like.

As shown in FIG. 11 to FIG. 13 described above, the lower frame portions 255b, 255b which form two lug portions form a part of the body frame 241, and the front fork 245 which forms the suspension device is supported by the head pipe 254 which forms the connecting portion of two lower frame portions 255b, 255b. A tensile force is generated by the rigidity adjustment device 300 between two lower frame portions 255b, 255b thus applying a pre-tension between two lower frame portions 255b, 255b and hence, a pre-force is applied to the left and right upper frame portions 255a, 255a in a direction that the left and right lower frame portions 255b, 255b extend in the fore-and-aft direction. Accordingly, hysteresis of the annular frame 264 which forms a rigid member is decreased in a direction that the head pipe 254 is easily displaced upward. That is, a pre-force is generated to the front fork 245 in the same direction as the upward moving direction of the front wheel 244 due to a reaction force of the front wheel 244 from the road surface.

With such a configuration, by merely mounting the rigidity adjustment device 300 on a part of the body frame 241 and applying a pre-tension to the part of the body frame 241, starting of the movement of the front wheel 244 in the upward direction can be assisted thus easily effectively taking out the performance of the suspension device including the front fork 245.

Embodiment 5

Figure 14:
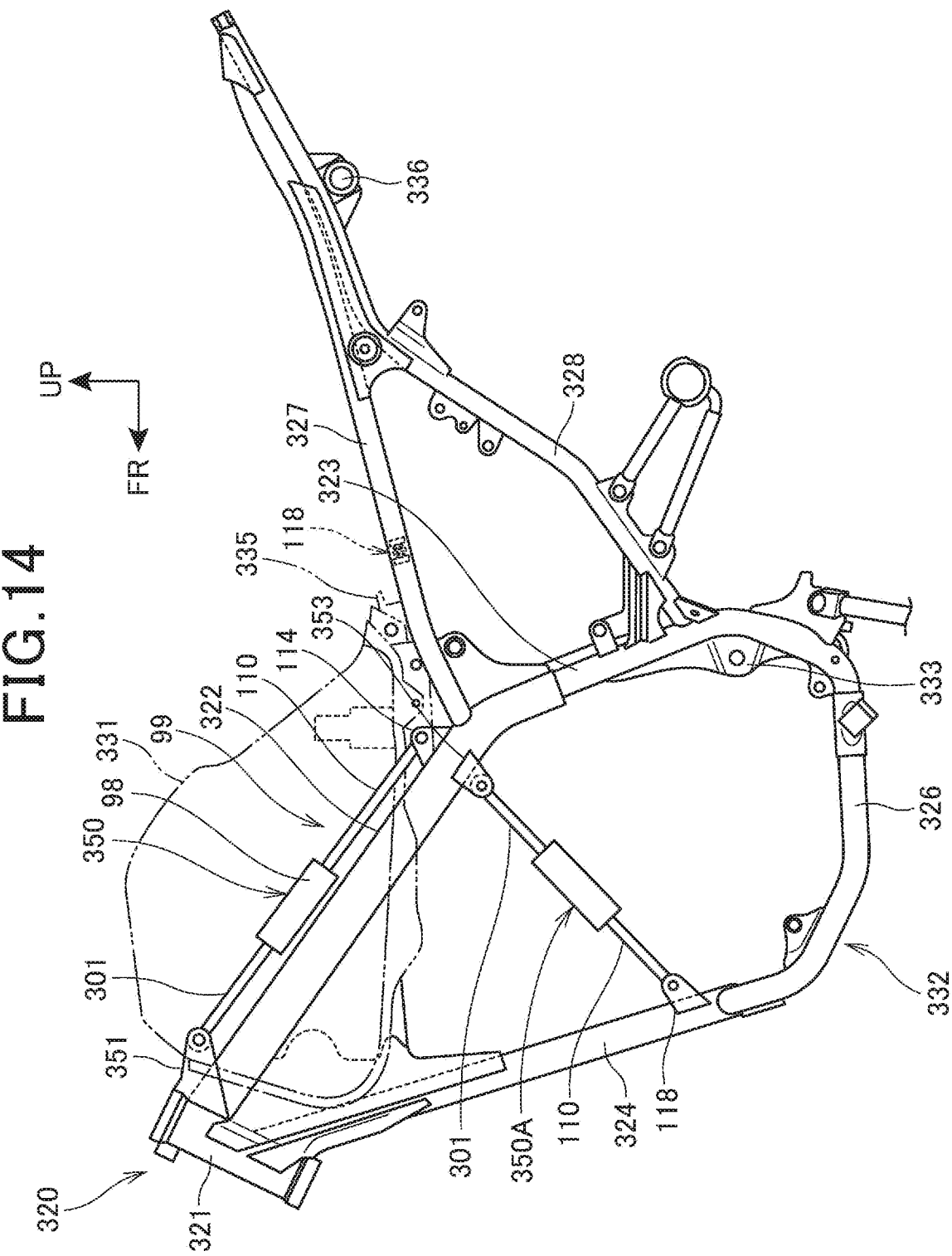
FIG. 14 is a left side view showing a body frame and a fuel tank for a motorcycle according to a fifth embodiment.
Figure 15:
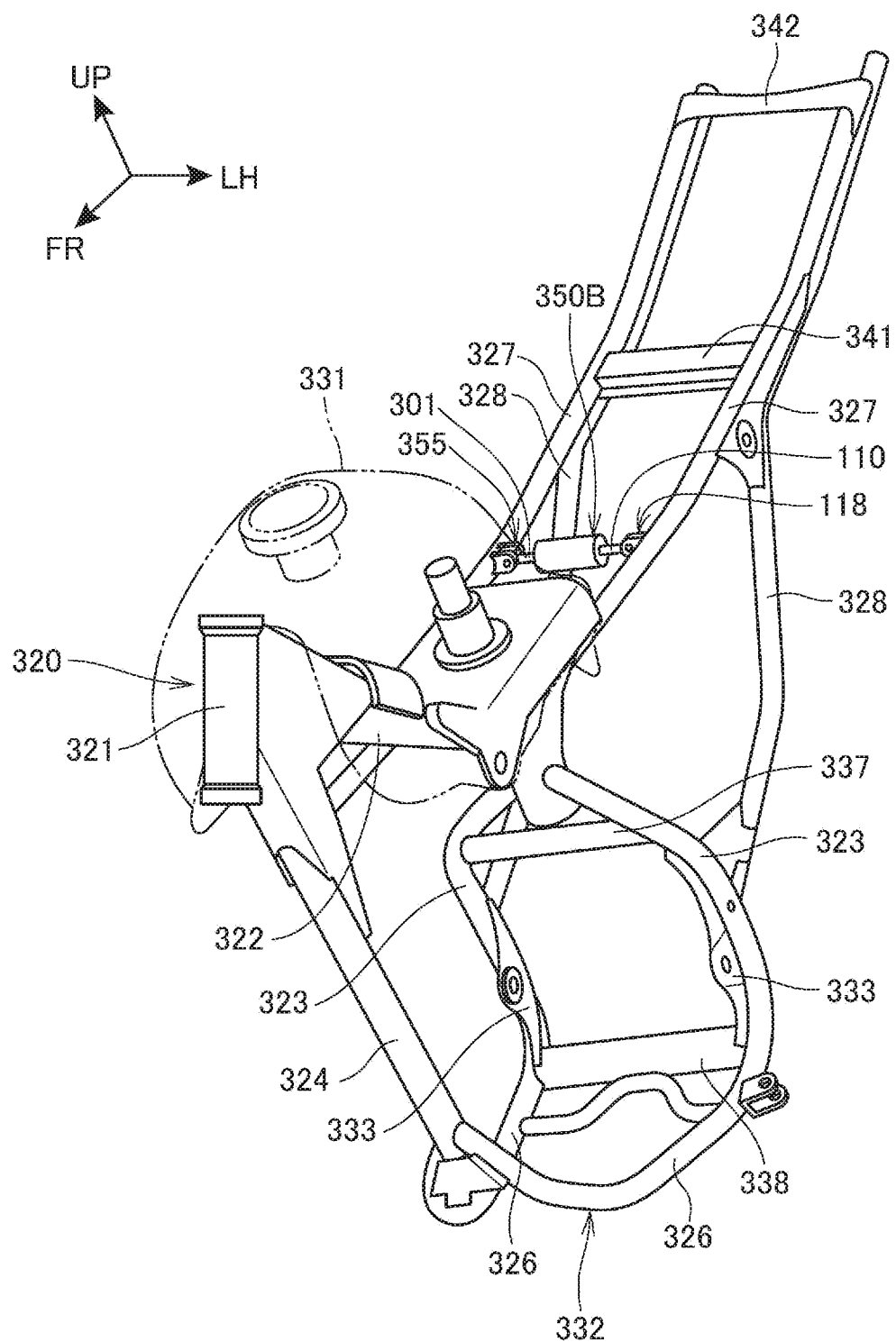
FIG. 15 is a perspective view showing the body frame and the fuel tank.

FIG. 14 is a left side view showing a body frame 320 and a fuel tank 331 for a motorcycle according to a fifth embodiment, and FIG. 15 is a perspective view showing the body frame 320 and the fuel tank 331.

As shown in FIG. 14, the body frame 320 includes a head pipe 321, a main frame 322, a pair of left and right center frames 323, a down frame 324, a pair of left and right lower frames 326, a pair of left and right seat frames 327, and a pair of left and right sub frames 328.

The head pipe 321 forms a front end portion of the body frame 320. The head pipe 321 steerably supports a front fork which forms a front wheel suspension device for suspending a front wheel of a motorcycle (small-sized saddle riding vehicle). The main frame 322 extends in an oblique rearward and downward direction from the head pipe 321, and supports the fuel tank 331. The left and right center frames 323 extend downward from left and right sides of a rear end portion of the main frame 322, and support an engine which forms a drive source of the motorcycle in cooperation with the left and right main frames 322. A pivot plate 333 is mounted on the left and right center frames 323 respectively. A pivot shaft (not shown in the drawing) is extended between the left and right pivot plates 333 so as to extend in a vehicle width direction. A swing arm (not shown in the drawing) which suspends a rear wheel of the motorcycle in a vertically rockable manner is mounted on the pivot shaft.

The down frame 324 extends in an oblique downward and rearward direction from a portion of the down frame 324 below a portion of the head pipe 321 on which the main frame 322 is mounted. The left and right lower frames 326 extend downward and rearward from left and right sides of a lower end portion of the down frame 324, and are connected to lower ends of the left and right center frames 323 respectively. The center frame 323 and the lower frame 326 are integrally formed with each other. The left and right seat frames 327 extend in an oblique rearward and upward direction from left and right sides of a rear portion of the main frame 322, and support a seat (not shown in the drawing) on which a rider of the motorcycle sits. Further, a tank support bracket 335 is mounted on the left and right seat frames 327 respectively, and a rear end portion of the fuel tank 331 is supported by the tank support brackets 335. The left and right sub frames 328 extend in an oblique rearward and upward direction from intermediate portions of the left and right center frames 323 in the vertical direction, and are connected to intermediate portions of the left and right seat frames 327 in a longitudinal direction respectively. A cushion support portion 336 which supports a rear cushion unit (not shown in the drawing) is provided to rear lower portions of the left and right sub frames 328 respectively.

As shown in FIG. 15, the left and right center frames 323 are connected to each other by a first center cross pipe 337 and a second center cross pipe 338 extending in the vehicle width direction. Further, the left and right seat frames 327 are connected to each other by an upper cross pipe 341 and a rear cross pipe 342 extending in the vehicle width direction.

The head pipe 321, main frame 322, left and right center frames 323, down frame 324, left and right lower frames 326, first center cross pipe 337, and second center cross pipe 338 described above form a front portion frame 332 which forms a rigid member.

In FIG. 14, a rigidity adjustment device 350 is disposed between the head pipes 321 and the main frames 322 which form the front portion frame 332 respectively.

The rigidity adjustment device 350 is formed of a cylinder/rod assembly 99, and a cylinder-side connecting portion 301 mounted on the cylinder body 98.

The cylinder-side connecting portion 301 has the same basic structure as the cylinder-side connecting portion 96 (see FIG. 5). However, a shaft portion provided to the cylinder-side connecting portion 301 is formed by further elongating the shaft portion 96b (see FIG. 5) of the cylinder-side connecting portion 96 shown in FIG. 5.

With respect to both end portions of the rigidity adjustment device 350, namely, a distal end portion of the cylinder-side connecting portion 301 is connected to a cylinder-side connecting portion 351 provided to an upper portion of the head pipe 321, and a distal end portion of a rod assembly 110 is connected to a rod support portion 114 provided to a rear portion of the main frame 322. The cylinder-side connecting portion 351 includes a pair of plate-like members mounted on the head pipe 321, and the cylinder-side connecting portion 301 is connected to these plate-like members by way of a connecting pin.

A pre-tension is applied to the rigidity adjustment device 350 such that the upper portion of the head pipe 321 is pulled rearward. With such a configuration, a pre-force is applied in a direction that the lower end of the head pipe 321 is lifted and hence, the rigidity adjustment device 350 can quickly respond to a force in a jolting direction from a road surface or the like so as to assist starting of the upward movement of the front wheel.

A rigidity adjustment device 350A is disposed between the main frame 322 and the down frame 324 which form the front portion frame 332. The rigidity adjustment device 350A is equal to the rigidity adjustment device 350. However, in this embodiment, a symbol is changed for distinguishing the rigidity adjustment device from each other. With respect to both end portions of the rigidity adjustment device 350A, that is, a distal end portion of a cylinder-side connecting portion 301 is connected to a cylinder-side connecting portion 353 provided to a rear portion of the main frame 322, and a distal end portion of a rod assembly 110 is connected to a rod support portion 118 provided to a lower end portion of the down frame 324. The cylinder-side connecting portion 353 includes a pair of plate-like members mounted on the main frame 322, and the cylinder-side connecting portion 301 is connected to these plate-like members by way of a connecting pin.

A pre-tension is applied to the rigidity adjustment device 350A such that the down frame 324 is pulled toward the main frame 322 side. With such a configuration, an angle (narrow angle) made by the down frame 324 and the main frame 322 is narrowed, and a pre-force is applied to the down frame 324 and the main frame 322 in a direction that the head pipe 321 is displaced in an oblique upward direction. With such a configuration, the rigidity adjustment device 350A can quickly respond to a force in a jolting direction from a road surface and the like so as to assist starting of the upward movement of the front wheel.

In FIG. 15, a rigidity adjustment device 350B is disposed between the left and right seat frames 327. The rigidity adjustment device 350B is equal to the rigidity adjustment device 350. However, in this embodiment, symbol is changed for distinguishing the rigidity adjustment device from each other.

One end of the rigidity adjustment device 350B is connected to a cylinder-side connecting portion 355 provided to one seat frame 327, and the other end of the rigidity adjustment device 350B is connected to a rod support portion 118 provided to the other seat frame 327. The cylinder-side connecting portion 355 includes a pair of plate-like members mounted on the seat frame 327, and the cylinder-side connecting portion 301 is connected to these plate-like members by way of a connecting pin. By generating an inward tensile force between the left and right seat frames 327 disposed parallel to each other, a pre-tension is applied in a direction that a length of the seat frame 327 which is an upper side of a triangular shape formed by the center frame 323, the sub frame 328, and the seat frame 327 is shrunken as viewed in a side view. As a result, a pre-tension is applied in an upward direction to the rear cushion support portion 336 disposed on a rear lower portion of the seat frame 327. With such a configuration, the rigidity adjustment device 350B can quickly respond to a force in a jolting direction from a road surface and the like so as to assist starting of the upward movement of the rear wheel.

In this embodiment, the rigidity adjustment devices 350, 350A, 350B shown in FIG. 14 and FIG. 15 have the same configuration. However, the present invention is not limited to such a configuration, and the rigidity adjustment devices 350, 350A, 350B may differ from each other in an outer diameter of a rubber member or in an inner diameter of a cylinder. Alternatively, provided that the rigidity adjustment devices 350, 350A, 350B have the same configuration, pre-tensions which the rigidity adjustment devices 350, 350A, 350B respectively apply may be set equal to or different from each other.

Sixth Embodiment

Figure 16:
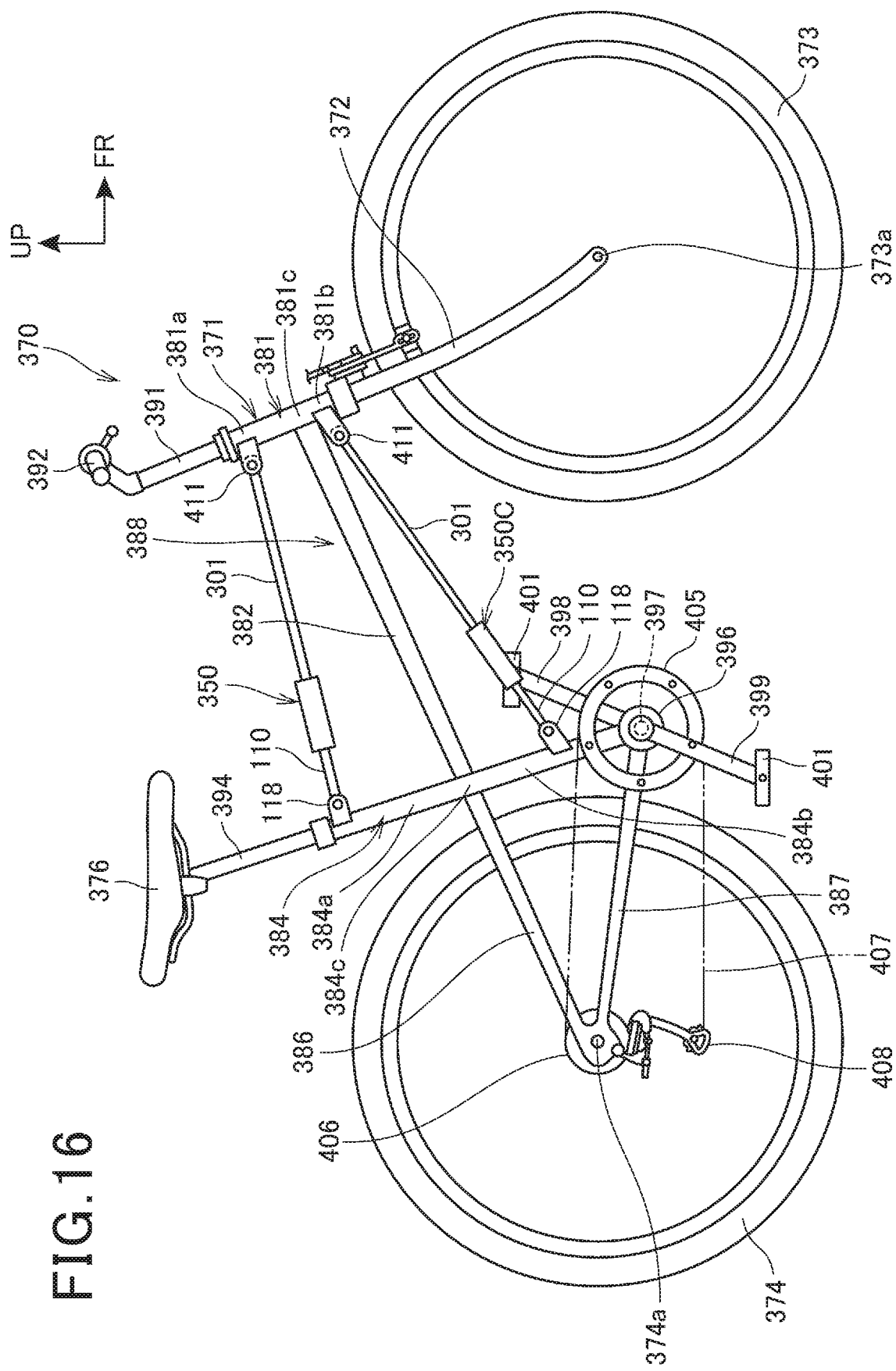
FIG. 16 is a right side view showing a bicycle according to a sixth embodiment.

FIG. 16 is a right side view showing a bicycle 370 according to a sixth embodiment.

A bicycle 370 which is a small-sized saddle riding vehicle (light vehicle) is configured such that a front wheel 373 is supported by a front end of a body frame 371 by way of a front fork 372, a rear wheel 374 is supported by a rear end portion of the body frame 371, and a saddle 376 is mounted on an upper portion of the body frame 371 by way of a seat post 394.

The body frame 371 includes a head tube 381, a top tube 382, a seat tube 384, a seat stay 386, and a chain stay 387. The head tube 381 is positioned on a front end portion of the body frame 371, and supports the front fork 372 in a steerable manner. The head tube 381 is formed of: an upside tube 381a positioned above a connecting portion 381c with the top tube 382; and a downside tube 381b positioned below the connecting portion 381c.

A handle stem 391 is mounted on an upper end portion of the front fork 372, and a handlebar 392 is mounted on the handle stem 391. A front wheel 373 is rotatably supported by a lower end portion of the front fork 372 by way of an axle 373a.

The top tube 382 extends in an oblique rearward and downward direction from the head tube 381. The seat tube 384 is connected to a rear end portion of the top tube 382 in a rearwardly inclined manner. The seat tube 384 is an integral body formed of: an upside tube 384a which is positioned above a connecting portion 384c connected with the top tube 382; and a downside tube 384b positioned below the connecting portion 384c. The seat post 394 is inserted into and fixed to an upper portion of the seat tube 384, and the saddle 376 is mounted on an upper end portion of the seat post 394.

A bearing portion 396 is provided to a lower end portion of the seat tube 384. The bearing portion 396 rotatably supports a crankshaft 397. A left crank 398 and a right crank 399 are mounted on both end portions of the crankshaft 397 respectively, and a pedal 401 is rotatably mounted on the left crank 398 and the right crank 399 respectively.

The seat stay 386 extends in an oblique rearward and downward direction from an intermediate portion of the seat post 394 in the longitudinal direction. The bearing portion 396 and a rear end portion of the seat stay 386 are connected to each other by the chain stay 387. The rear wheel 374 is rotatably supported by a connecting portion between the seat stay 386 and the chain stay 387 by way of an axle 374a.

A drive sprocket 405 is mounted on the crankshaft 397, a plurality of driven sprockets 406 are mounted on the rear wheel 374, and a chain 407 is extended between and wound around the drive sprocket 405 and the driven sprocket 406. A derailleur 408 for exchanging the chain 407 (transmission) with respect to the plurality of driven sprockets 406 is mounted on the connecting portion between the seat stay 386 and the chain stay 387.

The head tube 381, top tube 382, and seat tube 384 described above form an upper portion frame 388 which forms a rigid member.

The rigidity adjustment device 350 is disposed between the upside tube 381a of the head tube 381 and the upside tube 384a of the seat tube 384 which form the upper portion frame 388. With respect to both end portions of the rigidity adjustment device 350, that is, a distal end portion of the cylinder-side connecting portion 301 is connected to a cylinder-side connecting portion 411 provided to the upside tube 381a, and a distal end portion of a rod assembly 110 is connected to a rod support portion 118 provided to the upside tube 384a.

The cylinder-side connecting portion 411 includes a pair of plate-like members mounted on the upside tube 381a, and the cylinder-side connecting portion 301 is connected to these plate-like members by way of a connecting pin.

A second rigidity adjustment device 350C is disposed between the downside tube 381b of the head tube 381 and the downside tube 384b of the seat tube 384.

The second rigidity adjustment device 350C has the same basic structure as the rigidity adjustment device 350. However, in the second rigidity adjustment device 350C, an outer diameter of a rubber member and an inner diameter of a cylinder which accommodates the rubber member are smaller than an outer diameter of a rubber member and an inner diameter of a cylinder of the rigidity adjustment device 350. Accordingly, a tension which the second rigidity adjustment device 350C can generate is smaller than that of the rigidity adjustment device 350.

With respect to end portions of the second rigidity adjustment device 350C, that is, a distal end portion of the cylinder-side connecting portion 301 is connected to the cylinder-side connecting portion 411 provided to the downside tube 381b, and a distal end portion of a rod assembly 110A is connected to the rod support portion 118 provided to the downside tube 384b.

By the above-mentioned rigidity adjustment devices 350, 350C, a pre-tension is applied such that a tensile force is generated between the head tube 381 and the seat tube 384. Due to such a pre-tension, hysteresis of the upper portion frame 388 of the body frame 371 can be decreased and hence, the body frame 371 can be quickly and properly deflected in response to an input to the front wheel 373 from a road surface. Further, by applying a pre-tension also in a direction that the front wheel 373 is directed downward, it is possible to realize the bicycle 370 which can quickly respond to an input from a road surface and can acquire a good ground contact feeling. That is, due to a pre-tension generated by the rigidity adjustment devices 350, 350C, hysteresis of the head tube 381 can be properly decreased and hence, it is possible to provide the bicycle 370 which can make starting of the displacement of the front wheel 373 quicker, can quickly respond to a change in road surface, and is quickly and properly displaceable.

Seventh Embodiment

Figure 17:
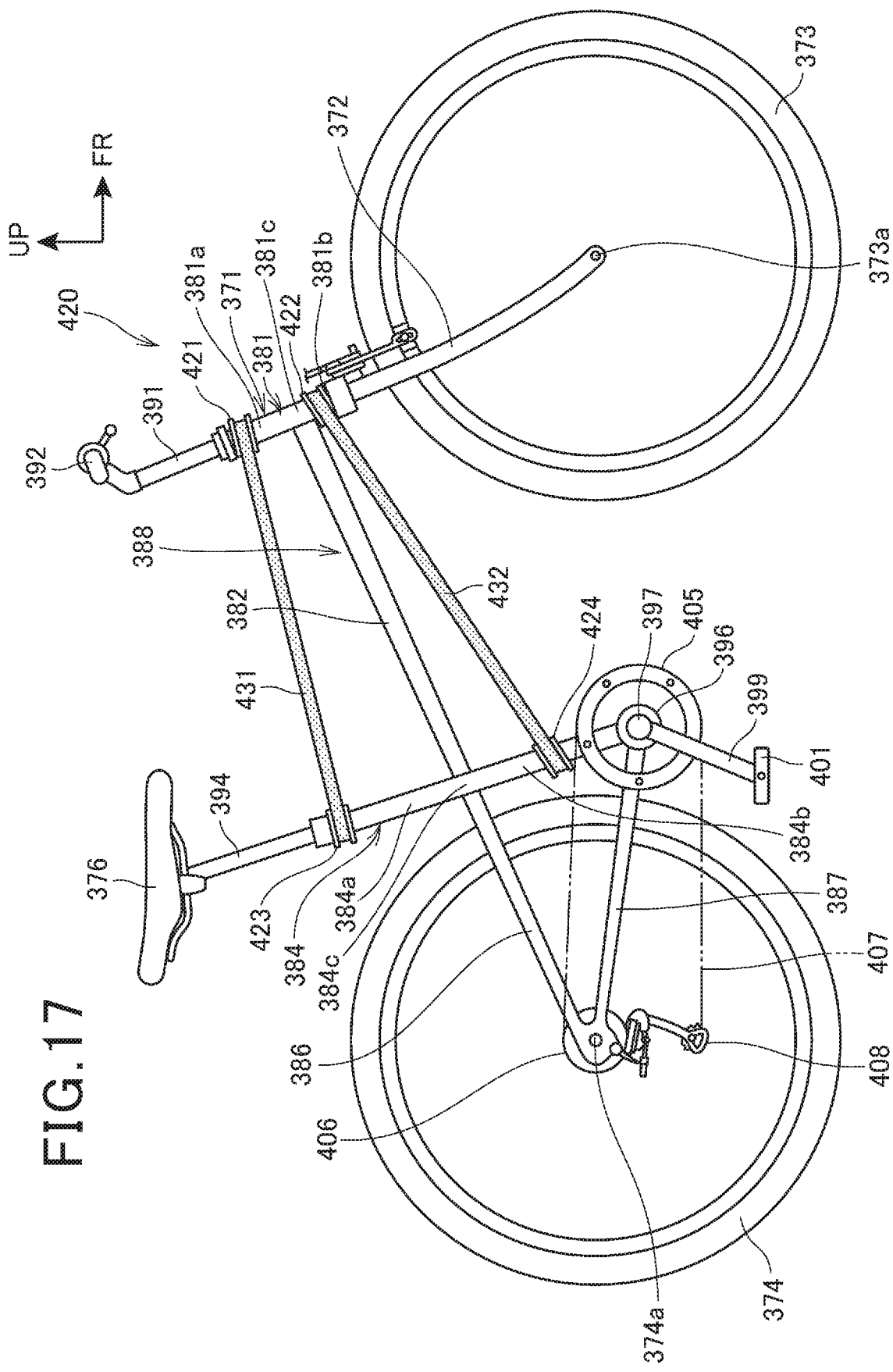
FIG. 17 is a right side view showing a bicycle according to a seventh embodiment.

FIG. 17 is a right side view showing a bicycle 420 according to a seventh embodiment.

In the seventh embodiment, configurations identical with the corresponding configurations of the sixth embodiment are given the same symbols, and their detailed description is omitted.

The bicycle 420 which is a small-sized saddle riding vehicle (light vehicle) is characterized in that the pre-tension apply means between the head tube 381 and the seat tube 384 is changed from the rigidity adjustment devices 350, 350C in the bicycle 370 according to the sixth embodiment (see FIG. 16) to rubber bands 431, 432.

In the head tube 381, a band winding portion 421 is provided to the upside tube 381a, and a band winding portion 422 is provided to the downside tube 381b.

In the seat tube 384, a band winding portion 423 is provided to the upside tube 384a, and a band winding portion 424 is provided to the downside tube 384b.

The band winding portions 421, 422, 423, 424 respectively have a flange where an upper end portion and a lower end portion of the flange have an outer shape larger than an intermediate portion of the flange in the vertical direction, and a band-shaped or a strip-shaped elastic member can be wound around the intermediate portion.

An endless rubber band 431 is extended between and is wound around the band winding portion 421 of the head tube 381 and the band winding portion 423 of the seat tube 384 as a band-shaped elastic member.

An endless rubber band 432 which forms a band-shaped elastic member is extended between and wound around the band winding portion 422 of the head tube 381 and the band winding portion 424 of the seat tube 384. A predetermined tension is generated on the wound rubber bands 431, 432, a tensile force is generated between the head tube 381 and the seat tube 384, and a pre-tension is applied between the head tube 381 and the seat tube 384.

Also by a tensile force and a vibration attenuation force due to the rubber bands 431, 432, it is possible to acquire substantially the same advantageous effect as the sixth embodiment and hence, it is possible to provide a rigidity adjustment device having simpler configuration.

A tension of the rubber band 431 and a tension of the rubber band 432 in a mounted state can be set variously depending on thicknesses, widths, lengths, and materials of the rubber bands 431, 432 respectively.

The above-mentioned embodiments are described only for exemplifying one mode of the present invention, and modifications and applications are conceivable as desired without departing from the gist of the present invention.

For example, in the above-mentioned embodiments, the rigidity adjustment device may be configured to acquire a tension generation function and a vibration attenuation function using members which are separate from each other and are disposed parallel to each other or in series.

Further, the present invention is not limited to the small-sized vehicle, and is also applicable to the quick vertical movement of wheels of a four-wheeled vehicle.

The adjustment of a tension by the rigidity adjustment device may be performed such that a tension is adjusted corresponding to a frequency obtained by a tire pattern thus allowing a tire to be brought into close contact with a road surface with low friction even when the road surface is a rough road surface. Further, a tension of the rigidity adjustment device may be adjusted corresponding to a frequency which contributes to the enhancement of braking performance in response to a frequency which appears at the time of braking.

As shown in FIG. 5, in the rigidity adjustment device 90, as the member which exhibits a tension generation function and a vibration attenuation function, the rubber member 92 is used. However, the present invention is not limited to the rubber member 92, and the rigidity adjustment device 90 may exhibit a tension generation function and a vibration attenuation function by combining air, other gases, a liquid such as an oil and the like.

Further, a buffer which buffers an impact transmitted from a road surface to the body frame 371 may be assembled to the front fork 372 of the bicycles 370, 420 shown in FIG. 16 and FIG. 17, and the buffer and the rigidity adjustment devices 350, 350C may be combined together or the buffer and the rubber bands 431, 432 may be combined together.

In the embodiments of the present invention, the rigidity adjustment device adopts the mechanism which generates a pre-force due to a tensile force. However, the rigidity adjustment device may adopt a mechanism which can properly decrease hysteresis by a pressing force.

REFERENCE SIGNS LIST 10, 140: rocking vehicle (small-sized vehicle)
11, 145, 241, 320, 371: body frame
12, 144: front wheel suspension device (suspension device)
13, 141, 244, 373: front wheel (wheel)
63: rocking shaft
64: rigid member
64a: left arm (lug portion)
64b: right arm (lug portion)
64c: upwardly extending portion (lug portion)
64k: cushion support portion (support portion)
65, 206: cushion unit
90, 300, 350, 350A, 350B: rigidity adjustment device
91: cylinder
92: rubber member (elastic member)
93: contact member (plate-like member)
94: rod
97: rod-side connecting portion (tension adjustment mechanism)
130: second rigidity adjustment device (rigidity adjustment device)
134c: downwardly extending portion (lug portion)
154: extension pipe (lug portion)
173: cushion support pipe (lug portion)
174, 332: front portion frame (rigid member)
208: cushion upper support bracket (support portion)
240: motorcycle (small-sized vehicle)
245, 372: front fork (suspension device)
254: head pipe (support portion, connecting portion)
255b: lower frame portion (lug portion)
264: annular frame (rigid member)
321: head pipe (support portion, lug portion)
322: main frame (lug portion)
324: down frame (lug portion)
350C: second rigidity adjustment device (rigidity adjustment device)
370: bicycle (small-sized vehicle)

The invention claimed is:

1. A saddle riding vehicle comprising a body frame and a suspension device which connects the body frame and a wheel to each other, in which the suspension device suspends the wheel in a displaceable manner in an upward direction due to a reaction force from a road surface,
wherein the saddle riding vehicle further comprises a rigid member, on the body frame side, having a support portion of the suspension device, and a rigidity adjustment device which is extended between plural portions of the rigid member,
the rigid member includes at least two lug portions which are connected in different extending directions,
the rigidity adjustment device is extended between the two lug portions,
the suspension device includes a cushion unit,
the rigidity adjustment device applies a pre-tension to the rigid member such that the two lug portions pull each other in a state that a reaction force of the wheel from the road surface is not applied, and
the pre-tension is set to generate a pre-force component to the support portion in the same direction as an upward moving direction of the wheel due to the reaction force of the wheel from the road surface,
a mounting portion of the cushion unit on the body frame side is formed on one of the two lug portions.

2. The saddle riding vehicle according to claim 1, wherein the rigidity adjustment device forms a triangular shape with the rigid member.

3. The saddle riding vehicle according to claim 2, wherein the saddle riding vehicle is a rocking vehicle, the rigid member is connected to the body frame by way of a rocking shaft, the rigid member includes a support portion for the cushion unit on the body frame side, a mounting portion of the cushion unit and one mounting portion of the rigidity adjustment device are provided to one lug portion of the rigid member, and the other mounting portion of the rigidity adjustment device is provided to the other lug portion of the rigid member.

4. The saddle riding vehicle according to claim 2, wherein the two lug portions form a part of the body frame, the suspension device is supported by a connecting portion of the two lug portions.

5. The saddle riding vehicle according to claim 1, wherein the rigidity adjustment device possesses both a tension generation function and a vibration attenuation function.

6. The saddle riding vehicle according to claim 5, wherein the rigidity adjustment device provides generation of a tension and attenuation of vibration by a rubber member.

7. The saddle riding vehicle according to claim 1, wherein the saddle riding vehicle comprises a plurality of the rigidity adjustment devices, and the rigidity adjustment devices include a first rigidity adjustment device which generates the pre-force component of the support portion in the same direction as the upward moving direction of the wheel due to the reaction force of the wheel from the road surface and a second rigidity adjustment device which generates a pre-force component of the support portion in the same direction as a downward moving direction of the wheel due to a reaction force of the wheel from the road surface.

8. The saddle riding vehicle according to claim 7, wherein the pre-tension of the first rigidity adjustment device and the pre-tension of the second rigidity adjustment device are made different from each other.

9. A rigidity adjustment device of a body frame of vehicle, wherein the vehicle includes a suspension device which connects the body frame and a wheel to each other, and a pre-tension is applied to a mounting portion of the suspension device of the vehicle,
the rigidity adjustment device includes: a cylinder; a rod which penetrates one end portion of the cylinder and extends from an inside of the cylinder to an outside of the cylinder; and a plate-like member which is provided to one-end portion of the rod in the inside of the cylinder and is movable in the inside of the cylinder integrally with the rod, and an elastic member is disposed between the plate-like member and one end portion of the cylinder,
a mounting portion to the body frame side is provided to the other end portion of the rod and the other end portion of the cylinder, and
a tension adjustment mechanism is provided to the rod and the cylinder, or on either one of the rod or the cylinder,
the elastic member is a rubber member.

10. A saddle riding vehicle comprising a body frame and a suspension device which connects the body frame and a wheel to each other, in which the suspension device suspends the wheel in a displaceable manner in an upward direction due to a reaction force from a road surface, wherein the saddle riding vehicle further comprises a rigid member, on the body frame side, having a support portion of the suspension device, and a rigidity adjustment device which is extended between a plural portions of the rigid member, the rigidity adjustment device applies a pre-tension to the rigid member, the pre-tension is set to generate a pre-force component to the support portion in the same direction as an upward moving direction of the wheel due to a reaction force of the wheel from the road surface, the rigidity adjustment device possesses both a tension generation function and a vibration attenuation function, and the rigidity adjustment device provides generation of a tension and attenuation of vibration by a rubber member.

* * * * *